United States Patent
Chandrasekaran et al.

(10) Patent No.: US 10,694,026 B2
(45) Date of Patent: Jun. 23, 2020

(54) SYSTEMS AND METHODS FOR EARLY FRAUD DETECTION

(71) Applicant: ROYAL BANK OF CANADA, Montreal (CA)

(72) Inventors: Karthikeyan Chandrasekaran, Toronto (CA); Roobini Mathiyazhagan, Toronto (CA); Ruturaj Maheshbhai Patel, Toronto (CA); Sreenath Vazhayil, Toronto (CA); Domenico Pagniello, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 0 days.

(21) Appl. No.: 15/998,877

(22) Filed: Aug. 16, 2018

(65) Prior Publication Data

US 2019/0141183 A1    May 9, 2019

Related U.S. Application Data

(60) Provisional application No. 62/546,355, filed on Aug. 16, 2017.

(51) Int. Cl.
*H04M 3/00* (2006.01)
*H04M 1/66* (2006.01)
(Continued)

(52) U.S. Cl.
CPC .......... *H04M 3/2281* (2013.01); *G06N 7/005* (2013.01); *G06N 20/00* (2019.01); *H04M 3/42059* (2013.01); *H04M 3/436* (2013.01); *H04M 3/5166* (2013.01); *H04M 3/523* (2013.01); *H04M 3/5183* (2013.01); (Continued)

(58) Field of Classification Search
CPC ............................. H04M 3/2281; G06N 20/00
USPC .............. 379/249, 188, 191, 265.01–265.14, 379/266.01–266.1, 309
See application file for complete search history.

(56) References Cited

U.S. PATENT DOCUMENTS 6,163,604 A * 12/2000 Baulier ................... H04M 3/36
379/189
6,437,812 B1 * 8/2002 Giles ..................... G06F 3/0481
715/853
(Continued)

*Primary Examiner* — William J Deane, Jr.
(74) *Attorney, Agent, or Firm* — Norton Rose Fulbright Canada LLP

(57) ABSTRACT

A computer implemented method and system for routing a call based on characteristics of call data are provided. The method may include: receiving or retrieving a first data set representing a first set of plurality of call features relating to an on-going call from a database; generating, using a machine learning model, a suspiciousness score of the on-going call based on the first data set, the suspiciousness score indicating a probability of the on-going call being a fraudulent call; routing the on-going call based on the suspiciousness score; displaying the first suspiciousness score on a graphical user interface; continuously receiving or retrieving a second data set representing a second set of plurality of call features relating to the on-going call from the database; updating the suspiciousness score of the on-going call based on the second data set; and displaying the updated suspiciousness score on the graphical user interface.

30 Claims, 17 Drawing Sheets

(51) Int. Cl.
 *H04M 1/667* (2006.01)
 *H04M 3/22* (2006.01)
 *H04M 3/42* (2006.01)
 *H04M 3/51* (2006.01)
 *G06N 20/00* (2019.01)
 *G06N 7/00* (2006.01)
 *H04M 3/523* (2006.01)
 *H04M 3/436* (2006.01)

(52) U.S. Cl.
 CPC .. *H04M 2201/42* (2013.01); *H04M 2203/558* (2013.01); *H04M 2203/6027* (2013.01)

(56) References Cited

U.S. PATENT DOCUMENTS

| | | | | |
|---|---|---|---|---|
| 7,158,622 | B2* | 1/2007 | Lawyer | G06Q 10/00 379/114.01 |
| 7,457,401 | B2* | 11/2008 | Lawyer | G06Q 10/00 379/114.14 |
| 8,638,916 | B2* | 1/2014 | Mahone | G06F 21/55 379/114.14 |
| 9,426,302 | B2* | 8/2016 | Layman | H04M 3/38 |
| 9,774,726 | B1* | 9/2017 | Jenkins | H04M 3/2281 |
| 2015/0281431 | A1* | 10/2015 | Gainsboro | H04M 3/2281 379/189 |

* cited by examiner

SYSTEMS AND METHODS FOR EARLY FRAUD DETECTION

PRIORITY

This application claims priority to and the benefit of U.S. provisional patent application No. 62/546,355 filed on Aug. 16, 2017, the entire content of which is herein incorporated by reference.

FIELD

The present disclosure generally relates to the field of call monitoring, and more specifically, to automated machine learning platforms configured for assessing and routing on-going suspicious calls.

INTRODUCTION

Assessing calls for suspicious activity can be difficult, time-consuming, and fraught with error. Malicious or unauthorized users often modify their approaches and utilize various techniques in "spoofing" or otherwise masquerading their calls as authorized calls.

Malicious or unauthorized activity can have significant detrimental effects, in some cases, these individuals are able to access information that should not be available to them (e.g., personal information), are able to issue commands that are not authorized (e.g., adding a long distance plan to perpetrate fraud), or impact the technical infrastructure supporting a call center or interactive voice response (IVR) system. For example, an IVR system may be more prone to cyberattacks where a malicious caller is able to apply a brute force attack using a range of dual-tone multi-frequency signalling (DMTF) tones, among others.

Investment in omni-channel customer service is a prominent corporate trend, and as companies are providing text, web self-service, instant messaging and other methods to deliver a better customer experience, many customers still call when they need service. For example, Forrester™ estimates that the phone is still the most widely used customer-service channel, with 73 percent of consumers calling into a call center. Since the introduction of Euro master visa (EMV) chips, fraudsters have turned their attentions towards contact center whose primary aim is to serve the customer rather than suspecting them.

Fraudster are taking advantage of these scenarios to try to implement various approaches such as social Engineering and brute force attacks, and these may lead to undesirable outcomes (e.g., taking over of an account by a malicious user).

SUMMARY

Computational approaches are described in various embodiments whereby computer systems are configured to automatically assess one or more characteristics of real-time or near-real time call data to identify suspicious calls.

In one aspect, a computer implemented method for routing a call based on one or more characteristics of call data is provided, the method may include: receiving or retrieving a first data set representing a first set of plurality of call features relating to an on-going call from a database; generating, using a machine learning model, a suspiciousness score of the on-going call based on the first data set, the suspiciousness score indicating a probability of the on-going call being a fraudulent call; routing the on-going call based on the suspiciousness score; displaying the first suspiciousness score on a graphical user interface; continuously receiving or retrieving a second data set representing a second set of plurality of call features relating to the on-going call from the database; updating the suspiciousness score of the on-going call based on the second data set; and displaying the updated suspiciousness score on the graphical user interface.

In some embodiments the method may include routing the on-going call based on the updated suspiciousness score.

In another aspect, a computer implemented method for assessing one or more characteristics of call data to identify suspicious calls is provided, the method may include: receiving or retrieving a first data set representing a first set of plurality of call features relating to an on-going call from a database; generating, using a machine learning model, a suspiciousness score of the on-going call based on the first data set, the suspiciousness score indicating a probability of the on-going call being a fraudulent call; displaying the first suspiciousness score on a graphical user interface; continuously receiving or retrieving a second data set representing a second set of plurality of call features relating to the on-going call from the database; updating the suspiciousness score of the on-going call based on the second data set; and displaying the updated suspiciousness score on the graphical user interface.

In yet another aspect, a system for routing a call based on one or more characteristics of call data is disclosed. The system including a memory device having machine-readable code stored thereon, and a processor configured to, upon executing the machine-readable code: receive or retrieve a first data set representing a first set of plurality of call features relating to an on-going call from a database; generate, using a machine learning model, a suspiciousness score of the on-going call based on the first data set, the suspiciousness score indicating a probability of the on-going call being a fraudulent call; route the on-going call based on the suspiciousness score; render a graphical user interface and display the first suspiciousness score on the graphical user interface; continuously receive or retrieve a second data set representing a second set of plurality of call features relating to the on-going call from the database; update the suspiciousness score of the on-going call based on the second data set; and display the updated suspiciousness score on the graphical user interface.

In some embodiments, routing the on-going call comprises: parking the on-going call in a queue, forwarding the on-going call to a human agent, forwarding the on-going call to a machine; removing the on-going call from a queue; or terminating the on-going call.

In some embodiments, routing the on-going call based on the suspiciousness score comprises routing the on-going call when the suspiciousness score is above or beneath a pre-determined threshold.

In some embodiments, the processor is configured to route the on-going call to a human agent when the suspiciousness score is beneath the pre-determined threshold.

In some embodiments, the processor is configured to route the on-going call based on the updated suspiciousness score.

In some embodiments, the first or second data set may be retrieved from an interactive voice response (IVR) system or a call center voice system.

In some embodiments, the first set of plurality of call features relating to the on-going call includes one or more historical call features regarding the on-going call.

In some embodiments, the one or more historical call features include one or more of: a telephone number, a client account number, a number of call times associated with the telephone number in a time period, a number of client account numbers associated with the telephone number in a time period, a number of distinct telephone numbers associated with the client account number, a client segment associated with the client account number, a number of authentication failures associated with the telephone number or the client account number in a time period, a number of hung-ups associated with the telephone number or the client number in a time period, an average past call duration associated with the telephone number or the client number, a number of times the client account number is accessed in a time period, and a validity of the telephone number.

In some embodiments, the one or more historical call features are retrieved based on a client ID relating to the on-going call.

In some embodiments, the client ID comprises a telephone number or a client account number.

In some embodiments, the machine learning model is trained by: receiving one or more training data sets of call data having one or more labelled fraudulent calls interspersed within a plurality of non-fraudulent calls; and using a machine learning device, extracting one or more feature templates from the one or more training data sets representing features indicative of a fraudulent call.

In some embodiments, the second data set is received or retrieved in real time or near real time and collected on a iterative basis.

In some embodiments, the first set of plurality of call features and the second set of plurality of call features contain one or more identical call features relating to the on-going call, and the one or more identical call features are iteratively updated during the on-going call.

In some embodiments, the method includes when suspiciousness score breaches a predefined limit, flagging or terminating the on-going call.

In some embodiments, the method includes rendering the suspiciousness score as an interactive interface element on the graphical user interface.

In some embodiments, the interactive interface element is a suspiciousness meter.

In an aspect, a computer-implemented method is provided that includes receiving one or more training data sets of call data having one or more labelled fraudulent calls interspersed within a plurality of non-fraudulent calls; using a machine learning device, extracting one or more feature templates from the one or more training data sets representing features indicative of a fraudulent call; receiving one or more data sets of real-time or near-real time call data relating to an on-going call; and applying the one or more feature templates to the one or more data sets to generate a suspiciousness score pertaining to the on-going call.

In another aspect, the applying of the one or more feature templates is conducted on an iterative basis, and the method comprises periodically updating the suspiciousness score pertaining to the on-going call.

In another aspect, upon the suspiciousness score breaching a predefined limit, the method includes automatically terminating the on-going call.

In another aspect, upon the suspiciousness score breaching a predefined limit, the method includes flagging the on-going call.

In another aspect, the one or more training data sets include identifiers of callers; and the applying of the one or more feature templates to the one or more data sets includes determining whether the any of the identifiers of callers correspond to a present caller; and the method includes: upon a determination that any of the identifiers of callers correspond to the present caller, weighting the application of the one or more feature templates responsive to whether the one or more training data sets associated with the present caller include any fraudulent calls.

In another aspect, the one or more training data sets include identifiers of callers; and the applying of the one or more feature templates to the one or more data sets includes determining whether the any of the identifiers of callers correspond to a present caller; and the method includes upon a determination that any of the identifiers of callers correspond to the present caller, weighting the application of the one or more feature templates responsive to whether the one or more training data sets associated with the present caller include any non-fraudulent calls.

In another aspect, the method includes: upon termination of the on-going call, labelling call data of the on-going call as fraudulent or non-fraudulent and appending the call data of the on-going call into the one or more training data sets.

In another aspect, the suspiciousness score controls rendering of an interactive interface element on a graphical user interface.

In another aspect, the interactive interface element is a suspiciousness meter.

In another aspect, the the one or more feature templates and the one or more training data sets of call data include both voice data and interactive voice response system data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
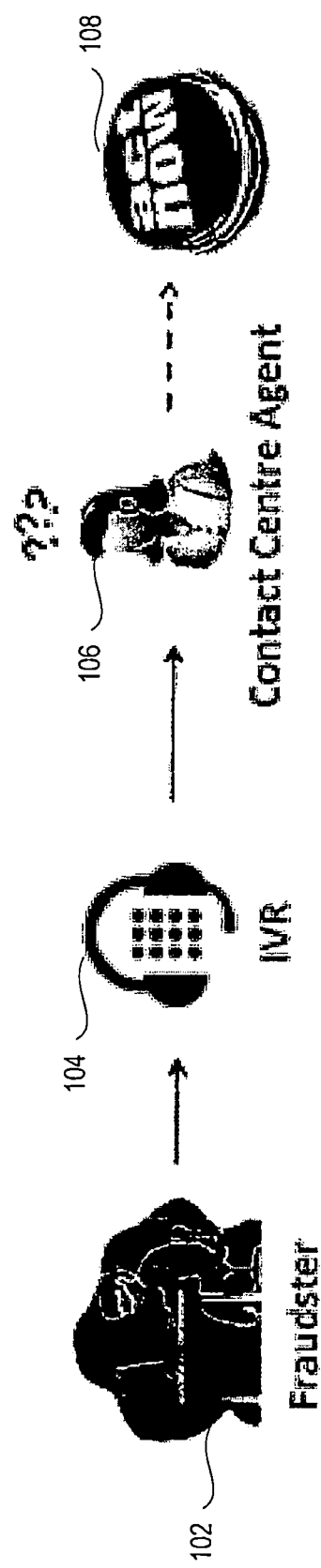
FIG. 1 is an example view of a call center environment, according to some embodiments.

A system is provided for real or near-time analysis of calls to a call centre to determine suspicious or fraudulent calls. FIG. 1 is an example view of a call center environment, according to some embodiments. As illustrated in FIG. 1, there may be various callers and these may include fraudsters 102. The callers interact with call center technologies or individuals, such as an IVR 104, or a contact centre agent 106.

In an approach without a machine learning component, fraudster 102 reaches the agent 106 through the IVR 104. When the call arrives, agents 106 typically need to serve and satisfy customer expectations. Where the caller is a fraudster 102, inexperienced agents 106 may become victims if there is no real- or near-real time intelligent and analytics system provided that can inform or make decisions based on about a customer's previous interactions, call history, customer behavioral patterns, etc. In some approaches, there is a lack of insight relating to a customer's previous interactions, and each call is being treated as an independent call and agents 106 are not equipped, for example, with information regarding the caller's previous history (e.g., on a day, week or monthly basis). Without an improved system, it is difficult to spot dynamic fraudster patterns, and inexperienced agents 106 are vulnerable to social engineering.

It is difficult to separate callers from fraudsters 102, as fraudsters are often actively seeking to mask their identity and operations, and often have access to some access credentials that may either be stolen or falsified, or simply guessed.

While it may be difficult and resource intensive for humans to identify fraudsters 102, computational approaches may potentially be more successful as computer systems equipped with machine learning capabilities may be able to draw relationships, patterns, and/or trends between seemingly unrelated features/variables, processing these relationships, patterns, and/or trends over a period of time and potentially across a large data set of caller data such that the machine learning approaches can be tailored and refined as more information becomes available to the system.

As described in various embodiments, a system for early fraud detection or estimation is provided to generate decision making information that can be used to enable a system to automatically cause various actions to occur (e.g., call termination, call flagging, enhanced call monitoring), or to update an interface 108 that imparts information by way of interactive interface elements that allow a responder to make an informed decision regarding various actions. The system identifies and is configured to refine (e.g., "learn") over time, the calling pattern of the clients from a voluminous set of historical call data.

The system generates predictions on whether the current call is fraud or not using machine learning techniques, and inputs are provided to maintain and/or update a machine learning model to establish linkages between the details about of a call and potential indicators of fraud.

Figure 2:
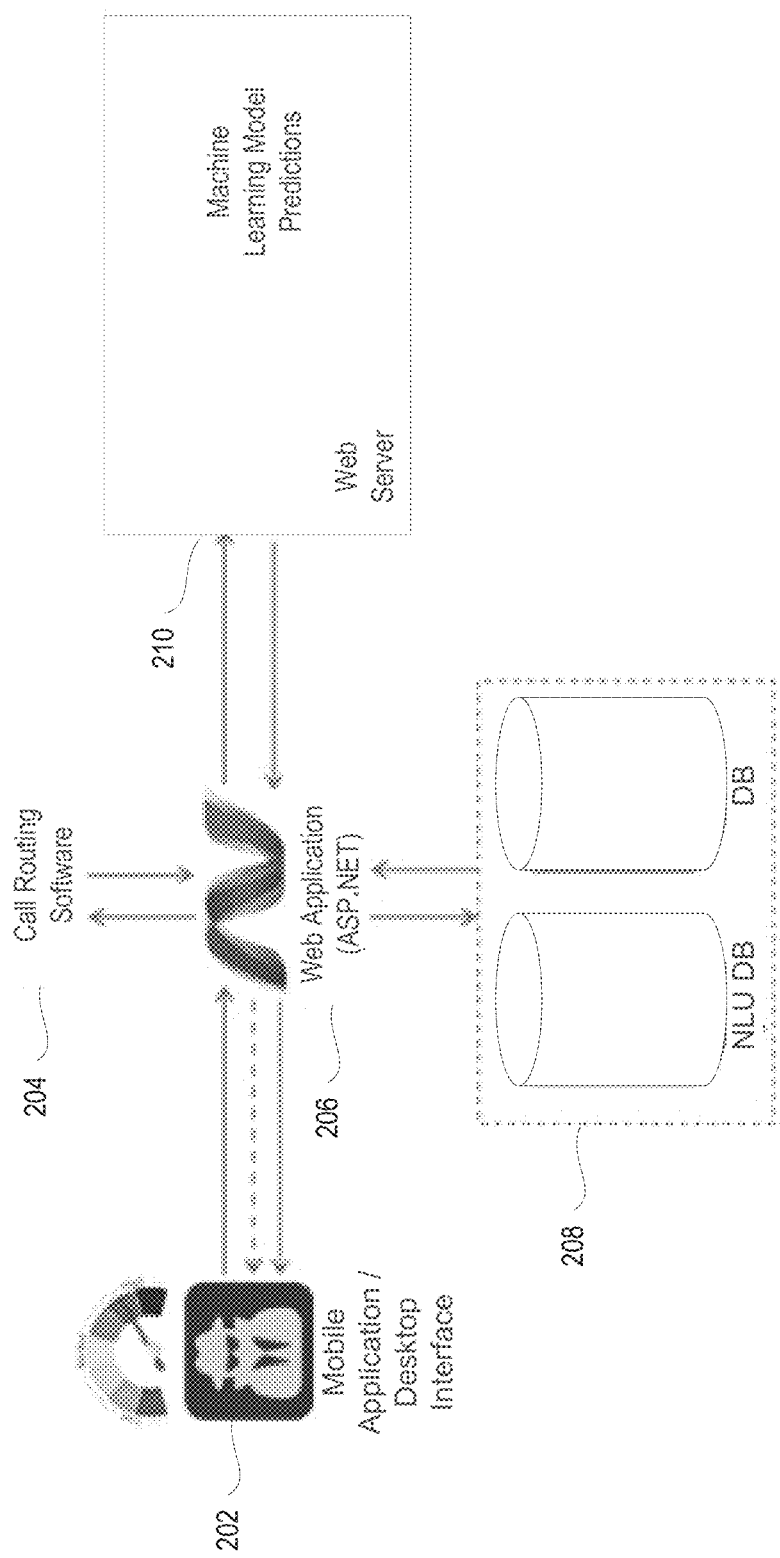
FIG. 2 is an example block schematic of a computing system configured for assessing suspicious calls, according to some embodiments.

FIG. 2 is an example block schematic of a computing system configured for assessing suspicious calls, according to some embodiments. As illustrated in FIG. 2, a mobile application or desktop interface 202 is provided that includes visual or graphical interactive elements that are continuously or periodically updated with suspiciousness score or meter as a call progresses in real time or near real time.

This interface 202 may be provided, for example, in the form of a mobile application, a desktop interface, a telephony system, a call centre dash boarding system, among others. For example, interface 202 may be a desktop application on all agent desktops, and may be built such that the user Interface is dynamically generated from a web server 210. Dynamic generation from a web server 210 may help in accepting future changes to desktop applications installed in all the agent desktops without re-installing the new version of application by pushing updates from the server 210.

In some embodiments, system 210 may be configured for routing a call based on one or more characteristics of call data. The call data may be used to determine if an on-going call is suspicious. The system including a memory device having machine-readable code stored thereon, and a processor configured to, upon executing the machine-readable code: receive or retrieve a first data set representing a first set of plurality of call features relating to an on-going call from a database; generate, using a machine learning model, a suspiciousness score of the on-going call based on the first data set, the suspiciousness score indicating a probability of the on-going call being a fraudulent call; route the on-going call based on the suspiciousness score; render a graphical user interface and display the first suspiciousness score on the graphical user interface; continuously receive or retrieve a second data set representing a second set of plurality of call features relating to the on-going call from the database; update the suspiciousness score of the on-going call based on the second data set; and display the updated suspiciousness score on the graphical user interface.

In some embodiments, the processor is configured to route the on-going call based on the updated suspiciousness score.

In some embodiments, routing the on-going call comprises: parking the on-going call in a queue, forwarding the on-going call to a human agent, forwarding the on-going call to a machine; removing the on-going call from a queue; or terminating the on-going call. For example, if the suspiciousness score indicates that the call is highly likely to be a fraudulent call, system 210 may be configured to forward the call to a machine or an expert handling fraudulent calls. If the suspiciousness score indicates that the call is unlikely a fraudulent call, system 210 may be configured to forward the call to a human agent for further processing.

In some embodiments, routing the on-going call based on the suspiciousness score comprises routing the on-going call when the suspiciousness score is above or beneath a pre-determined threshold.

In some embodiments, the processor is configured to route the on-going call to a human agent when the suspiciousness score is beneath the pre-determined threshold. The pre-determined threshold may be for example, 80 out of a score of 100. The pre-determined threshold may vary for different departments or different caller IDs.

The interface 202 may be configured to establish a connection with a web application hosted on a web server 210 when an agent logs in through, for example, a representative Asset ID of the agent's desktop. A web application 206 in conjunction with the web server 210 is configured to continuously monitor call related events for the particular agent.

Whenever a new call arrives via routing software 204 and the client is identified, the required call related data is retrieved from the multiple databases and sent back to the desktop application or interface 202 as insights. A prediction score may be requested from a machine learning service operated by web server 210. The prediction score, for example, may be derived using a Python web server where the machine learning model is preloaded to provide predictions. The predictions may be shown to the agent in the form of a suspiciousness meter on interface 202.

Call routing mechanisms 204 may be provided, and may include various telephony systems, voice recording systems, Voice over IP systems, among others, where calls may recorded and feature information may be extracted as a call proceeds, in the form of call data. The call data may include, for example, sound wave files (e.g., .WAV files, .mp3 files), transcribed calls (e.g., transcripts), recorded DMTF tones (e.g., for push-button telephone interaction with caller menus), or other information. Telephony equipment may gather the call data in the form of data sets. The data sets may be processed by a web application 206 (e.g., ASP.NET), and may be transformed for usage in providing to one or more machine learning models provided on server 210.

The data sets, in raw or a transformed form, may be stored on one or more data storage 208, which may include, for example, a Parley NLU Database™, or an Infomart Database™, among others. Where more than one data storage 208 are utilized, each of the data storages 208 may be configured for different usages and store different data structures. For example, a first data storage may be utilized for storing raw or compressed call records, and a second data storage may be configured to store processed information from the machine learning system, including feature templates, identified linkages, machine learning parameters/variables/nodes, among others.

In some embodiments, the call data sets representing one or more call features of an on-going call may be retrieved from the IVR system or a live call with a human agent. The data sets may be linked to one or more client identification means such as a telephone number or a client account number. In some cases, the telephone number may be used as the client account number. In some cases, the client account number may be a bank account number. The data sets from the IVR system or the live call may be linked to a client account number through the telephone number gathered by the IVR system or learned by the agent during the live call. System 210 may continuously receive real time or near real time information from the IVR system or the live call, and process the information to obtain one or more data sets, such as a first or second data sets, regarding the on-going call. System 210 may be configured to update the suspiciousness score based on the real time or near real time information and call data sets. In some embodiments, the system may be able to update the suspiciousness score every 10 seconds, and display the updated score on the graphical user interface presented to the agent to aid the agent with dealing with a potentially fraudulent call.

In some embodiments, the first set of plurality of call features relating to the on-going call includes one or more historical call features regarding the on-going call. The historical features may be obtained from a database connected to system 210 or a database at IVR.

In some embodiments, the one or more historical call features include one or more of: a telephone number, a client account number, a number of call times associated with the telephone number in a time period, a number of client account numbers associated with the telephone number in a time period, a number of distinct telephone numbers associated with the client account number, a client segment associated with the client account number, a number of authentication failures associated with the telephone number or the client account number in a time period, a number of hung-ups associated with the telephone number or the client number in a time period, an average past call duration associated with the telephone number or the client number, a number of times the client account number is accessed in a time period, and a validity of the telephone number.

For example, data may be collected from a plurality of data sources in a call center environment. In some embodiments, in order to train a machine learning model used to generate the suspiciousness score, millions of call records may be first collected over the course of a period, such as a 6- or 12-month period, and then cleansed and processed, before being transmitted to the machine learning training unit and used to generate feature templates used by the machine learning model.

An example data table is disclosed below showing examples of data retrieval by system 210.

| | |
|---|---|
| Infomart - Genesys (call center software) | Used HiveSQL to extract required columns from Infomart call table and stored as excel file for further processing |
| Parley - IVR | Used HiveSQL to extract data from drt_dialogs table and stored as excel file for further processing |

In some cases, data cleansing may be performed by system 210 after collection from various data sources. Examples of data cleansing are shown in the table below.

| Activity | Data Cleansing |
|---|---|
| Phone number with call ID missing i.e., it might be | Making client account access (as linked to a phone number) as null. The phone number may be unavailable due to call |

| Activity | Data Cleansing |
|---|---|
| anonymous, unknown or internal phone number | display blocking. |
| Splitting 24 hours into 6 slots | 24-hour is divided into six slabs, each averaging 4 hours. This numbered feature may be fed to the machine learning model. This process of numbering based on slabs may be referred to as hot encoding. |
| Splitting average talk duration into 5 slots, based on a duration of the call | Average Talk duration slots are as follows. Slot 1. Less than 150 secs Slot 2. 150 secs to 300 secs Slot 3. 301 secs to 450 secs Slot 4. 450 secs to 600 secs Slot 5. Above 600 secs |
| Adding "+1" before caller id dynamically whenever it is required. | +1 is missing in Infomart call database before majority of the clid (phone number) and we need to add this for joining with ANI (phone number) filed in IVR database |

Once a call has been initiated, that is, once a call has been placed into the IVR or a live call system, a caller ID or client ID in the form of a telephone number may be retrieved. This telephone number may be used to link the IVR system and the backend system or database, where historical information regarding the telephone number may be stored. In some cases, the telephone number may not be readily available, where a caller may have used call blocking to block an incoming caller ID being displayed.

In some embodiments, the telephone number may be immediately associated, by system 210, with an existing client account number, which may also be referred to as a SRF throughout the disclosure. The telephone number or the client account number may be used to then retrieve other records to assist with generation of the suspiciousness score in real time or near real time.

In some embodiments, if a telephone number is not readily available, a client account number may still be used to retrieve other records, for example, the system may connect IVR and call database, a K_Om_ivr_id field, which may represent an IVR ID, may be used to link the on-going call with a client account number, if such a client account number exists.

In some embodiments, if the caller with anonymous caller ID reaches the system, all IVR values may be set to null and those null/missing values may be handled later in machine learning model.

Feature Templates and Feature Engineering for Machine Learning

Feature engineering herein may refer to a process during which one or more features of a call are selected and refined for training the machine learning model and later used by the trained machine learning model to generate a prediction regarding a suspiciousness score. A set of features may be selected and the cleaned dataset may be analyzed using Matplotlib library and python.

Figure 8:
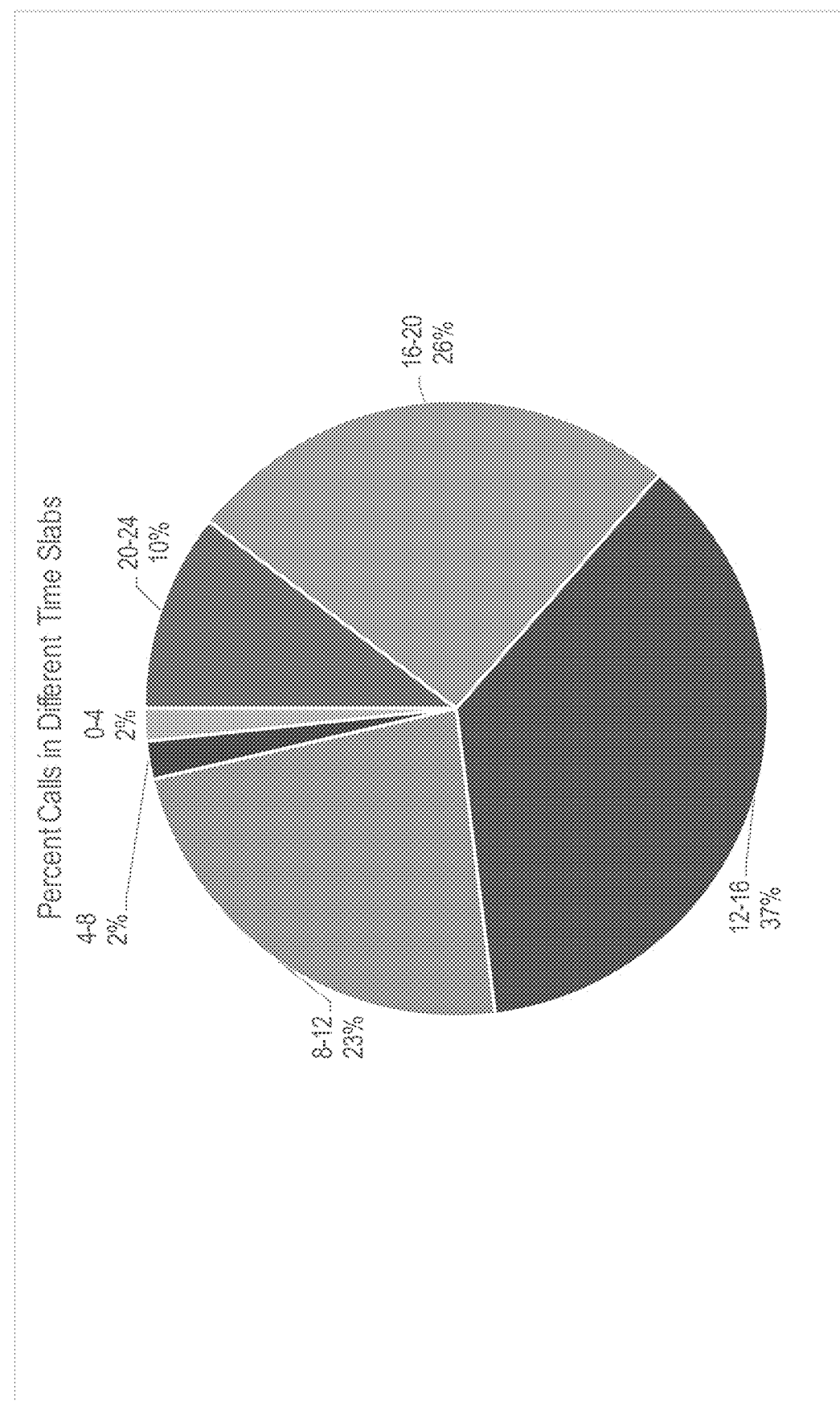
FIG. 8 is a diagram showing call times divided into different periods of time.

Referring to FIG. 8, which shows a graph demonstrating a call time of various calls. The call time may refer to a time at which a call has been received by the system. On analyzing the 2 million call records, it has been observed that a higher percentage of the total calls are between 12:00-16:00 slab. By visualizing the start time of the calls, the calls are divided into time slabs which help in categorizing the data into time zones. It has been observed that a very high number of suspicious calls are coming in evening and night according to an unix time zone. Therefore, the time slabs between 17:00 to 24:00 may be weighed higher in terms of likely fraudulent calls.

Figure 9:
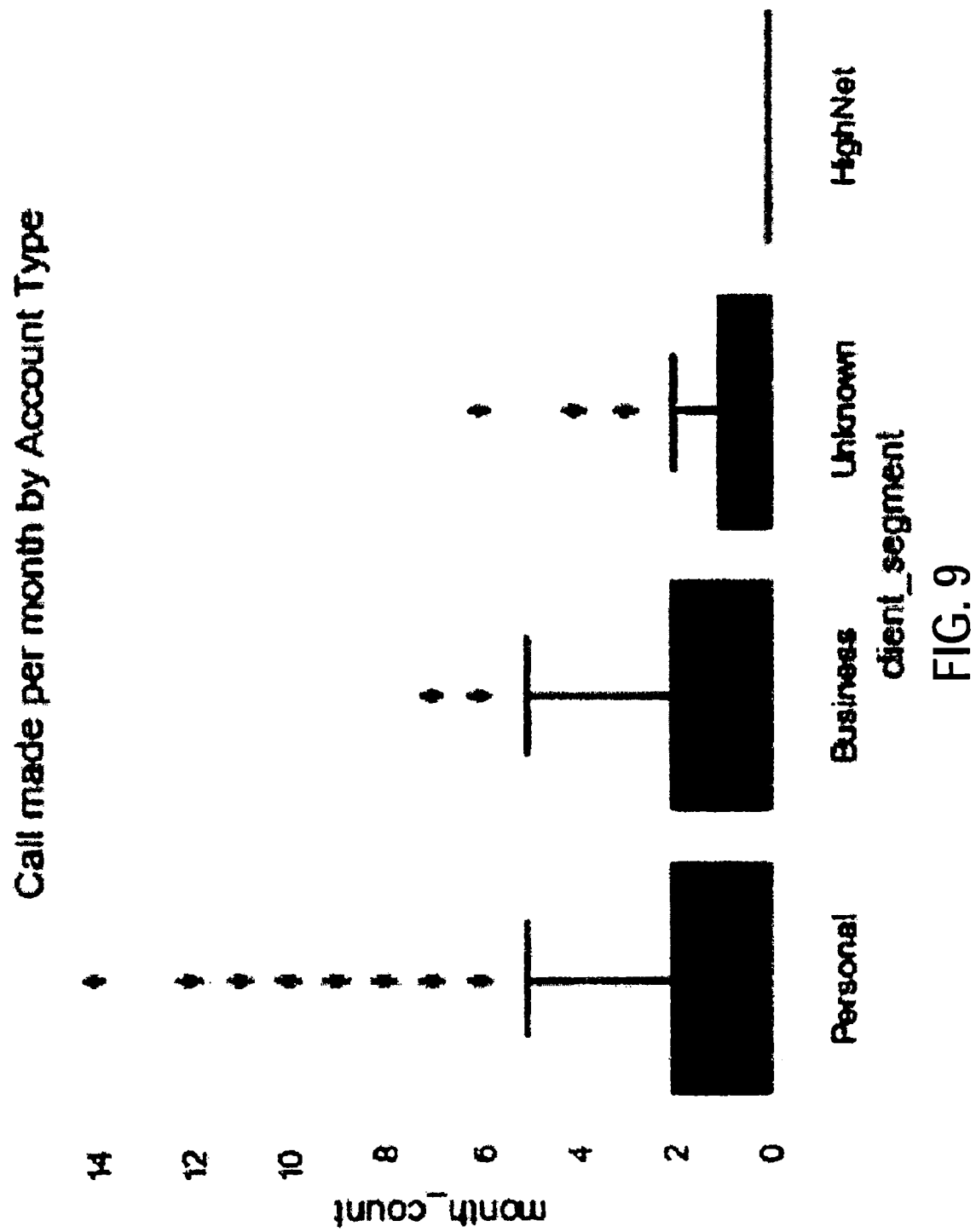
FIG. 9 is a graph showing calls made per month by client account type.

FIG. 9 shows targeted client segments by fraudsters. It has been observed from analysis that the number of likely fraudulent calls for personal and business client segments is higher than that of the high-net client segment. This may indicate that the fraudsters are typically targeting personal and commercial banking clients for which the information can be available relatively easily.

Figure 10:
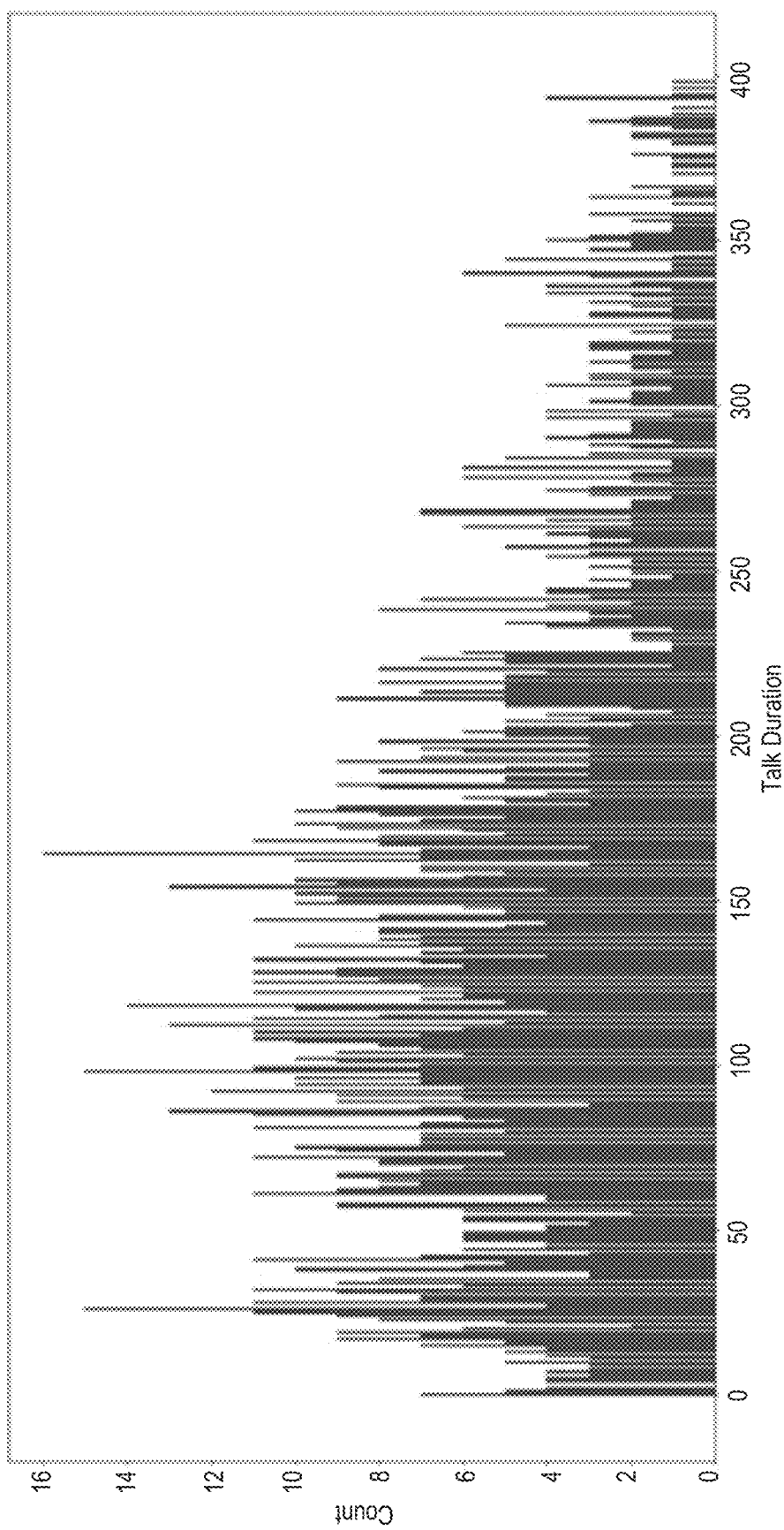
FIG. 10 is a graph showing call time durations.

FIG. 10 shows call time duration of various calls. One of the earlier assumptions for the project was that the fraudsters might try to spend more time with agents to get more details about particular client before attempting fraud. However, as shown in FIG. 10, it may appear that fraudsters generally try to spend less time on the call, collecting small pieces of the information they need and calling back again with a question next time.

Figure 11:
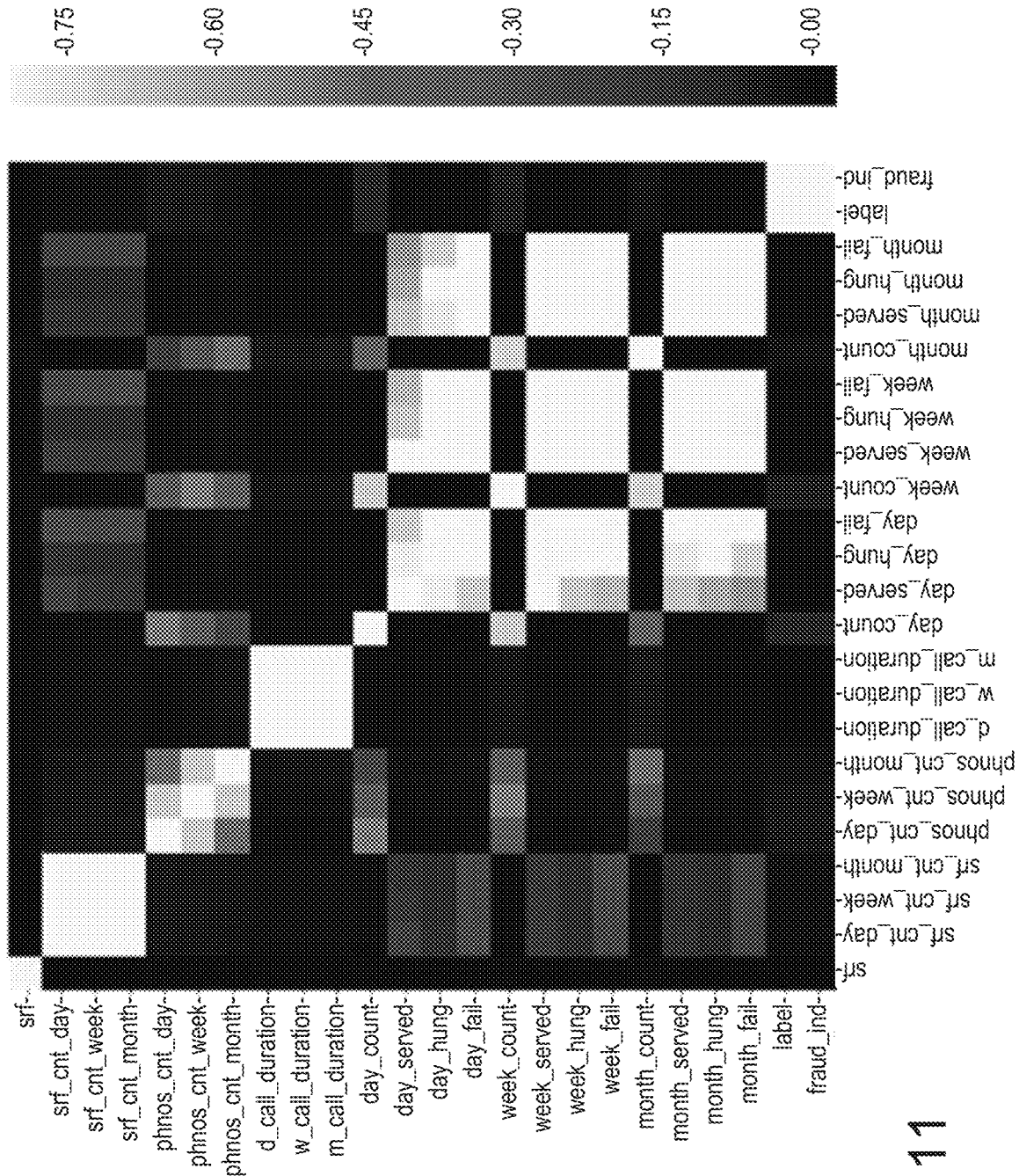
FIG. 11 is a graph showing example correlation matrix between various features.

FIG. 11 shows a correlation matrix between various features. To create a rich set of features, features should not correlate with each other much or else the machine learning algorithm might be biased to a particular pattern. By plotting the correlation matrix with Pandas, Matplotlib and Python, it is clear that the features created are not correlated other than simple aggregations. Also, the correlation matrix helped in identifying some of the nearly correlated features like the number of SRF count is correlated with the IVR activities such as served, hung up and IVR authentication failed.

Feature templates may be sets of variables that provide reference templates to conduct matching or relevance searching. These templates may be based on identified positive or negative occurrences of fraud, and may be generated or maintained by server 210 on storage 208. Feature templates may be associated with weightings and linkages that are utilized for establishing probabilities and inferences, and these weightings and linkages may be stored in a data structure that forms linkages between different variables (e.g., representative of linear correlation, non-linear relationships, etc.). Accordingly, machine learning may be performed, for example, may continuously or periodically updating feature templates, which are utilized for generating similarity analyses with calls based on real-time received call data, historical call data, among others.

The server 210 uses machine learning to analyze a variety of call data (e.g., received in the form of electronic data sets). The server 210 includes one or more processors, and computer readable media (e.g., memory, data storage) that are configured to provide machine learning capabilities.

The server 210 may be configured to perform the following, among others: (1) Real Time Analytics, (2) Real Time Risk Score Prediction, and (3) Conversational Text Analytics.

| Components | Description |
| --- | --- |
| Real Time Analytics | Detailed insights about every call's previous interactions from various sources (IVR, live call data) to contact center agents. |
| Real Time Risk Score Prediction | Captures call behavior of users from various data sources and predicts suspiciousness of the call using machine learning. |
| Conversational Text Analytics | Alerting contact center agents by understanding speech to identify the keywords/phrases that fraudsters generally use in their conversations. |

Example sources of information may include channel information from other sources (e.g., financial institution records, (i) call metadata from various data sources (IVR and call metadata), (ii) client demographics data such as age, branch location, occupation, address, etc. (iii) internet banking details—number of successful/failure attempts made before calling in that day, password resets, etc.).

Relationships and linkages are established between various anchor points of information, or extracted feature sets.

The server 210 may, in some embodiments, automatically extract and generate feature data from the electronic data sets, and, in some embodiments, external contextual information. The server 210 is configured for continuous or periodic feedback, enabling the system to dynamically adjust, over a period of time, based on identified outcomes (e.g., false positive, true positive, false negative, true negative), and the linkages and relationships formed are maintained and/or updated on storage 208. In some embodiments, machine learning is established through iterating using a training set, and labelled data may be repurposed as future training data, which may also be stored on storage 208.

Information that may be analyzed, for example, include a time of call, number of IVR attempts, number of calls made on the same day, etc. Features may in some embodiments be iteratively extracted and refined, gradually increasing the accuracy of the machine learning model over the course of time (e.g., by seeking to optimize a variable or reduce an error rate). Interface elements may be included to generate insights about the client's past interactions with the contact center so that the agent 106 is better equipped to serve the client.

The server 210 is configured to assess the suspiciousness of a call using machine learning processes, providing various attributes from the above mentioned sources to the machine learning model and in return, the model determines (e.g., assigns) a suspiciousness score for the call. The machine learning processes may include ensembling of logistic regression, support vector machines (SVM), gradient boosting and extreme gradient boosting (XGBoost), among others.

Feature engineering can be utilized by the machine learning process, and as more features/attributes are available, the better a dataset will be for training. In some embodiments, the machine learning approach is adapted for choosing and weighting essential indicators that will help in detecting fraud in real time calls.

Supervised Learning may be used for the machine learning in some embodiments. In one training case, 2 million calls were analyzed and 2000 calls were suspicious among them which indicates that the data may be highly imbalanced (0.1% is suspicious).

The machine learning model can use call metadata from two different data sources (IVR and call databases). Unique attributes may be constructed from the above mentioned data sources and fed to the machine learning model as input.

For example, a series of potential attributes that could be used for implementing machine learning model are provided below:

1. Time of the call (as converted into six time slabs)
2. Number of times the current phone number accessed other SRFs
3. Number of times the current SRF was accessed by distinct phone numbers
4. Client segment—personal, business or high networth
5. Language—English, French, or Mandarin, etc.
6. Number of times IVR served successfully for the current phone number
7. Number of times IVR authentication failed for the current phone number
8. No of times the call was hung up in the IVR by the current phone number
9. Call durations (as converted into time slots)
10. Number of times the current SRF has been referred
11. Is it a valid phone number?
12. Age
13. Occupation
14. Branch location
15. Number of login attempts successful in internet banking
16. Number of login attempts failed in internet banking
17. Location of the call
18. Is it from a blocked phone number list?
19. Recent Password Resets
20. Number of calls made in a period (day, week, month)

Once these features/attributes are fed to the machine learning model, the model is configured to analyze the call pattern/behavior and the server 210 is configured to generate/display a suspiciousness score of the call with a message to the user as displayed on a graphical user interface, according to some embodiments.

The suspiciousness/risk score, which may be a prediction, may be generated in real time, and may be useful in effectively finding out dynamic fraudster patterns as a call unfolds. In some embodiments, client conversation speech is be converted to text and analyzed to identify/estimate an intent and identify for suspicious keywords/phrases that fraudster generally use to perform fraud.

The server 210 receives call data from call routing software 204 as a call is on-going, and periodically or continuously determines, by processing earlier call data pertaining to the same call and incoming new call data, if the call is potentially suspicious.

For example, the machine learning decision outputs can cause various actions to be implemented, such as routing the call, such as to a more experienced person in the call centre. The server 210 also provides a real-time dashboard for call centre personnel to view during a call, e.g., on interface 202. In contrast to solutions provided by various systems such as pin drop (which utilizes voice biometrics, ANI, network packet loss, etc.) for combating contact center fraud in real time, some embodiments described herein provide a real time system that leverages the calling pattern of the client from historical call data and predict a suspiciousness score of the call.

Server 210, in some embodiments, is configured to expose analytics data as a web service, providing a contact center a flexible approach automatically route the call based on computationally set threshold value. Accordingly, based on the outputs of server 210, fraudsters 102 who are trying to attack contact center agents 106 or IVR 104 will now be directly routed to experienced agents to handle the case. In this way, automated (e.g., bot) attacks whose primary aim is to apply brute force attack on IVR and extract information, can be automatically identified, and captured, such that a server 210 can issue command signals representing action (e.g., terminating the call instead of serving, potentially reducing impacts of a distributed denial of service attack).

In some embodiments, the server 210 is configured to further identify legitimate users who may be facing problems of above average difficulty and are calling frequently, and connecting them to be served at an appropriate level with better customer outcomes (e.g., speedier resolution). In these cases, the server 210 automatically routing such calls to an experienced agent could be beneficial.

The server 210 maintains a dynamic determination of the suspiciousness score as the conversation between client and agents goes by based on updated call information, potentially combined with an analysis of information earlier in the call (e.g., attempted 500 DMFT combinations), or identified related calls (e.g., calls originating from the same number, area code, having the same caller ID, having similar background noise).

For example, when a call arrives and the client is identified, the server 210 could be configured to generate a visual interface element to provide the agent 106 with a suspiciousness score based on the machine learning model and information pertaining to the client's previous interactions. The improved information may aid contact center agents 106 in making better judgements in handling that call and, the agent 106 can take further actions with more confidence in combating fraud.

Figure 6:
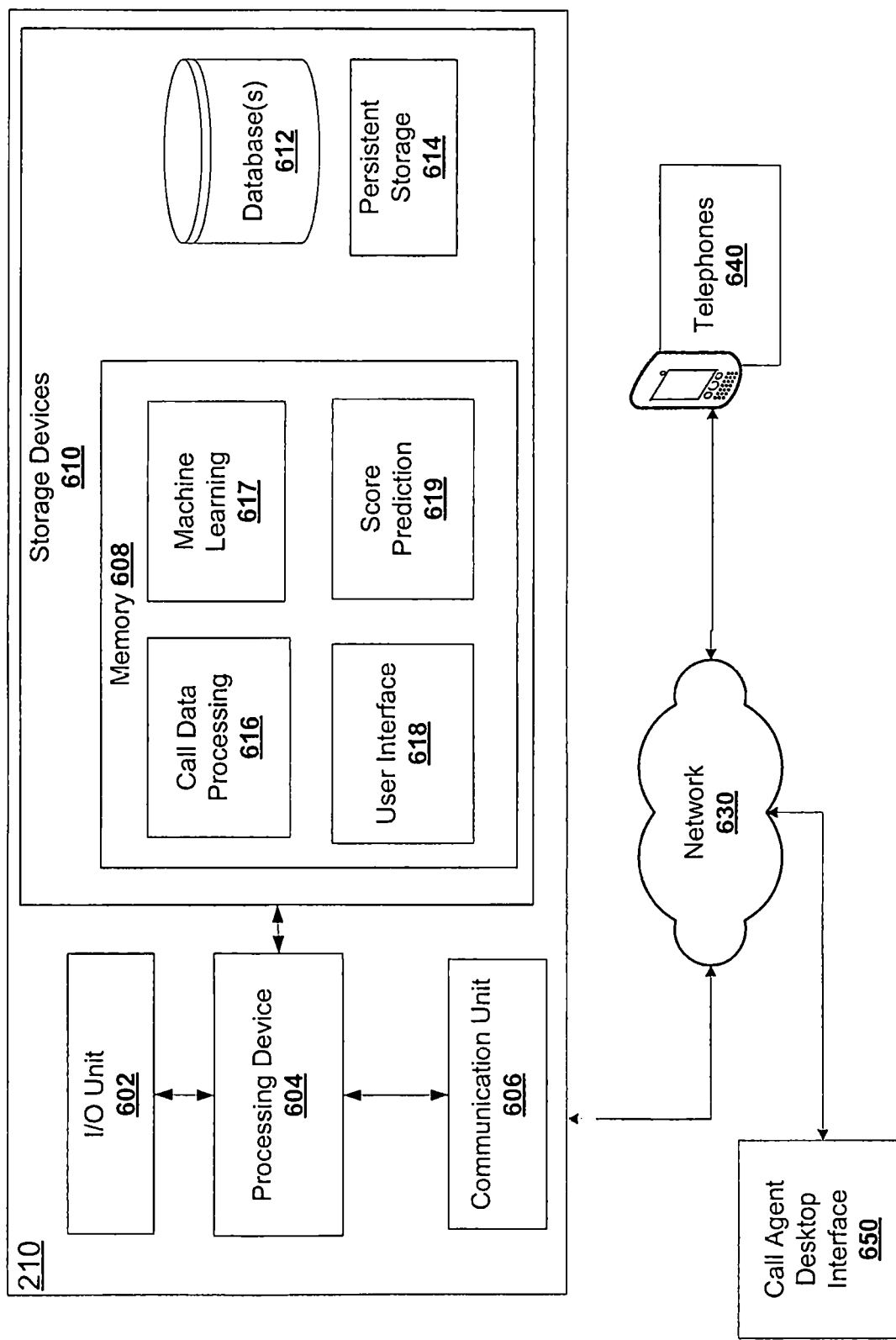
FIG. 6 is an example schematic diagram of a system configured for assessing suspicious calls, according to some embodiments.

FIG. 6 is a schematic block diagram of a physical environment for a system 210 for assessing on-going calls. The system may be a web server in some embodiments, The system may receive calls from telephone devices 640 over network 630, and be connected to one or more agent desktops 650 for rendering graphical user interface and displaying information regarding the calls from telephone devices 640.

System 210 may be software (e.g., code segments compiled into machine code), hardware, embedded firmware, or a combination of software and hardware, according to various embodiments.

System 210 may in some embodiments be configured to assess the suspiciousness of a call using machine learning processes, providing various attributes from the above mentioned sources to the machine learning model and in return, the model determines (e.g., assigns) a suspiciousness score for the call. The machine learning processes may include assembling of logistic regression, support vector machines (SVM), gradient boosting and extreme gradient boosting (XGBoost), among others.

A processor or processing device 604 can execute instructions in memory 608 to configure various components or units 616, 617, 618, 619. A processing device 604 can be, for example, any type of general-purpose microprocessor or microcontroller, a digital signal processing (DSP) processor, an integrated circuit, a field programmable gate array (FPGA), a reconfigurable processor, or any combination thereof.

Each communication interface 606 enables the system 210 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Each I/O unit 602 enables the system 210 to interconnect with one or more input devices, such as a keyboard, mouse, camera, touch screen and a microphone, or with one or more output devices such as a display screen and a speaker.

Data storage 610 can be, for example, one or more NAND flash memory modules of suitable capacity, or may be one or more persistent computer storage devices, such as a hard disk drive, a solid state drive, and the like. In some embodiments, data storage 610 comprises a secure data warehouse 612 and/or persistent storage 614 to host call data.

Memory 608 may include a suitable combination of computer memory such as, for example, static random-access memory (SRAM), random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like.

A call data processing unit 616 may be configured to process electronic data sets relating to current and past calls. For example, unit 616 may cleanse and format the data sets prior to sending them to a machine learning unit 617. The call processing unit may be configured to retrieve data sets regarding an on-going call from internal and external databases such as an IVR database.

A machine learning unit 617 may be configured to generate a suspiciousness probability based on a first and/or second data set representing a plurality of call data features of an on-going call. The machine learning unit may be configured to receive the data sets in real time or near real time, such that it may be configured to update the suspiciousness probability based on current state and conversation relating to the on-going call.

A score prediction unit 619 may be configured to generate a fraud suspicion score in real time or near real time based on a suspiciousness probability of the on-going call from machine learning unit 617, and provide the generated score to user interface unit 618 for presentation.

Figure 4:
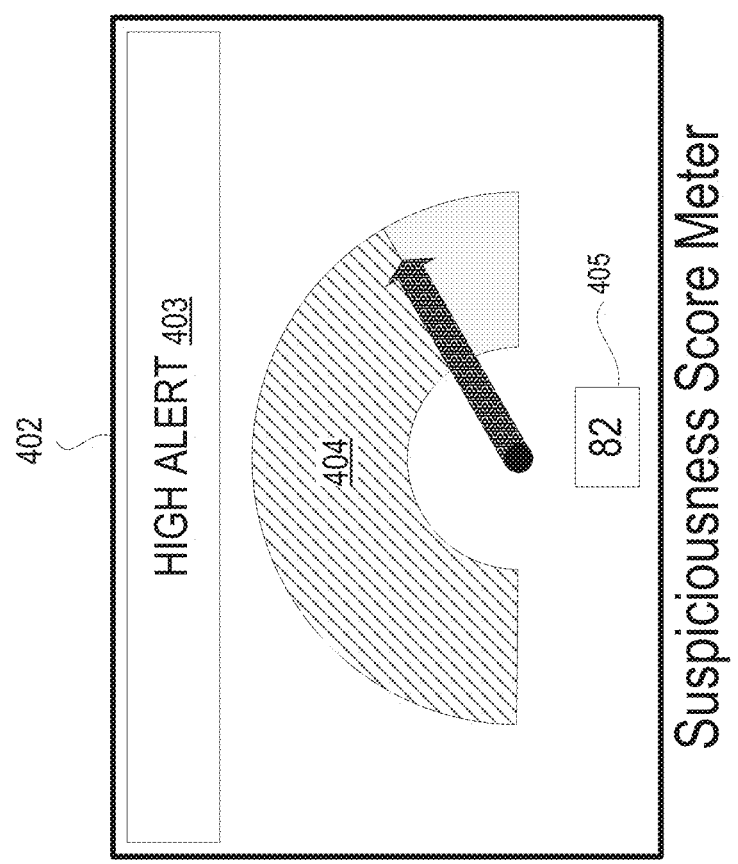
FIG. 4 is an example interface screen showing a visual interface element of a suspiciousness score meter, along with a score, according to some embodiments.

A user interface unit 618 may be configured to provide a graphical user interface to one or more agents and render the suspiciousness score on the graphical user interface. In some embodiments, the suspiciousness score may be rendered as a meter 402, as shown in FIG. 4, described below.

Figure 7:
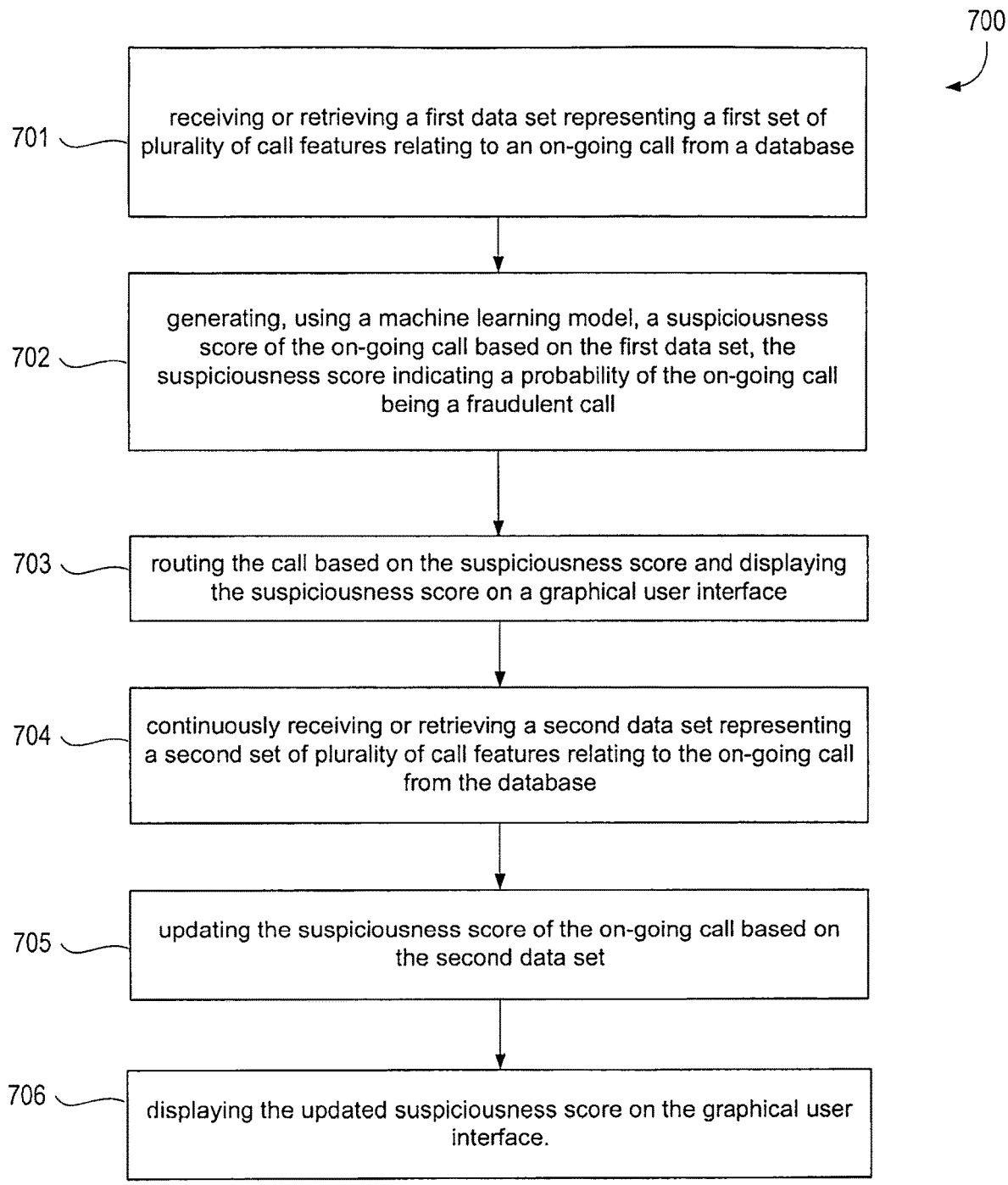
FIG. 7 is an example process performed by the system configured for assessing suspicious calls, according to some embodiments.

FIG. 7 shows an example process 700 that may be performed by processor of system 210. The processor may perform following steps: at step 701, receiving or retrieving a first data set representing a first set of plurality of call features relating to an on-going call from a database; at step 702, generating, using a machine learning model, a suspiciousness score of the on-going call based on the first data set, the suspiciousness score indicating a probability of the on-going call being a fraudulent call; at step 703, routing the on-going call based on the suspiciousness score and displaying the first suspiciousness score on a graphical user interface; at step 704, continuously receiving or retrieving a second data set representing a second set of plurality of call features relating to the on-going call from the database; at step 705, updating the suspiciousness score of the on-going call based on the second data set; and at step 706, displaying the updated suspiciousness score on the graphical user interface.

Figure 3:
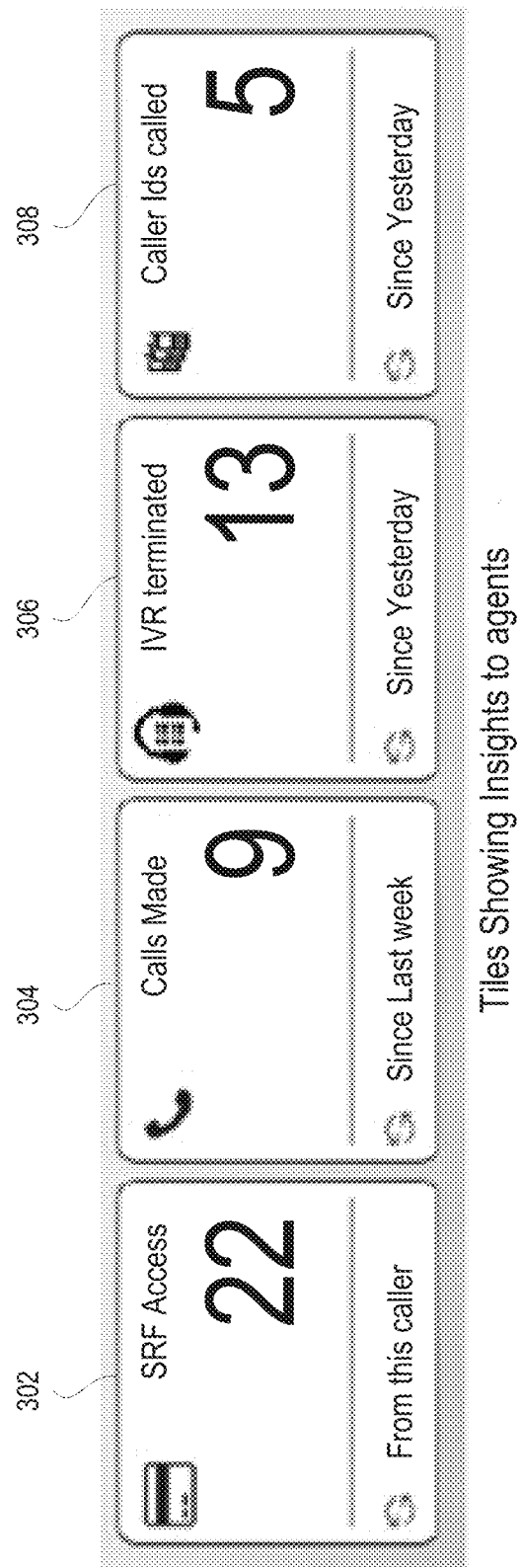
FIG. 3 is an example interface screen provided to call agents, according to some embodiments.

A sample interface is shown on FIG. 3, illustrating interface element tiles 302-308, showing various insights to agents. In this example, tile 302 indicates SRF (unique account number of a client) access requests (e.g., a number of times the current phone number accessed other SRFs in a day/week/month), tile 304 indicates a number of calls made (e.g., a number of times the current SRF was accessed in a day/week/month), tile 306 indicates a number of IVR connections terminated (e.g., phone number has failed to authenticate or hung up (without answering) in IVR in a day/week/month), and tile 308 indicates a number of different caller IDs that have been recorded (e.g., a number of Phone numbers that have accessed the current SRF in a day/week/month). The time period for data collection may vary from last 24 hours to last 6 hours, or to last week or even last month.

Below table demonstrates example insights for each tile in FIG. 3.

| Tiles | Description |
| --- | --- |
| SRF Access | Number of times, current phone number of the call accessed other SRFs (card number) in a time period (e.g. past 24 hours). |
| Calls Made | Number of times this account was accessed in the past 24 hrs. |
| IVR Failed | Number of times, current phone number of the call has failed to authenticate in IVR in the past 24 hrs. |
| Caller Ids Called | Number of distinct phone numbers that accessed this account number in the past 24 hrs. |

Each tile or insight may have daily, weekly, and/or monthly counts when a user hovers on top of each tile via the graphical user interface. By default, in some embodiments, daily count may be displayed.

The tiles may be interactive, and for example, upon hovering over a tile 302-308 showing information for a particular day, agents may be provided with detailed information about week or month of each tile if required.

The interface can include further interactive components and visual interface elements, such as dynamic scoring: During a call, if any keywords/phrases pops up that matches (or is similar enough to) with identified fraudster patterns, a suspiciousness score can be configured to be displayed on an interface screen for contact center agents 106 for further action. This score can be dynamically adjusted as the call progresses.

Information, including real-time analytics feed data can be exposed as web service which can then be used to automatically route the call based one or more thresholds (e.g., thresholds as predefined values set by the businesses, or as atomically adjusted values). For example, if the no. of times a particular SRF was accessed in a day is more than 10, then the call can be directly routed to an experienced agent to serve the call by 204. Accordingly, if a legitimate customer is in trouble he will be effectively served by experienced agent or if the fraudsters 102 are trying to hack the account by repeated calls, experienced agents or fraud team may be automatically tasked with handling the case in a timely manner.

In some embodiments, the server 210 may be configured to further utilize other data (e.g., cross banking data) to feed them into the machine learning process for better understanding of different patterns of fraud, based on a combination of call records and other recorded information (e.g., financial institution information).

In some embodiments, ASP.Net web application may be implemented to monitor the call events using Genesys API and Vertica database for IVR data and Infomart data.

A Vertica database table 'FRED_GENESYS_DATA' may be maintained to store the call metadata with the following columns:
media_id varchar(100), which is a media session ID of the call
clid varchar(20), which is a caller ID, also referred to as client ID in some cases, and is typically represented by the telephone number, if available
srf varchar(100), which is a client account number
start_time timestamp, which is the start time of the call
conn_id varchar(100), which is a connection ID of the call
language varchar(50), which is a language indicator, e.g. English or French
client_segment varchar(50), which is client segment, e.g. personal, business or high net worth
talk_duration int, which is a call duration The IVR Data can be directly accessed from the NLU Oracle Database. In some embodiments, another Vertica database table 'FRED_IVR_DATA' may be maintained with the following columns:
id varchar(256)
oradate timestamp
ani varchar(20)
end_type varchar(100)
myevents varchar(512)

One or more of the call metadata from at least a month old may be pre-loaded into the vertica tables stored in system 210, since system 210 can use up to a month old data for real time prediction. When the system is live, since the web application is running on all agent desktops, the required details from each call may be written to the vertica database from the web application directly during and after each call, in order to generate real-time or near real-time insights and suspiciousness probabilities by system 210.

As soon as a call reaches a contact center agent, system 210 may retrieve the necessary details like the phone number and SRF number from the call event. Using these details, it may hit the vertica tables to construct the complete features that are required for machine learning in order to generate a suspiciousness probability/score prediction.

Example Implementations of Machine Learning

In some embodiments, Python SKlearn library may be used for machine learning. Above-mentioned features may be fed to the machine learning for training. Data sets may be divided into 70:30 for training and testing. It means 70% percent of the may be exposed to the model for training and 30% of data may be used for model validation.

Below technical details are handled while training the machine learning model:
(i) Handling missing values using Imputer library
(ii) Normalization using Standard Scalar
(iii) Balancing class samples—using class weight and up sampling As described earlier, the data may be imbalanced. Different techniques may be applied to handle the imbalanced data. For example, synthesizing more number of suspicious calls using SMOTE (Synthetic Minority Oversampling Technique) technique. Minority class may be synthesized with different ratios. The records may be split in the ratio 70:30 as training and test set respectively before synthesizing the minority class. The model may be trained with with synthesized data and tested with original data.

For another example, the data may be balanced by adding more weightage to the suspicious class. Different class weights may be added to the minority class (suspicious calls).

The machine learning model may be trained with different supervised learning models with 70% of the collected data and the remaining 30% not exposed to the models. This 30% may be used to assess the performance of the models. The metrics considered for assessing the performance of the models are suspicious call prediction rate (true positives) and false positives. It may be found that extreme gradient boosting model gives good result among all the models by predicting 58% of the suspicious calls accurately with 1.35% false positives.

In some embodiments, the machine learning model may be trained with Logistic Regression. Initially the model was trained with default parameters except the class weight such as: logReg=LogisticRegression (C=1, penalty='l2', fit_intercept=True, max_iter=100, tol=0.0001, n_jobs=−1, class_weight='balanced', solver='liblinear', random_state=42).

Figure 12:
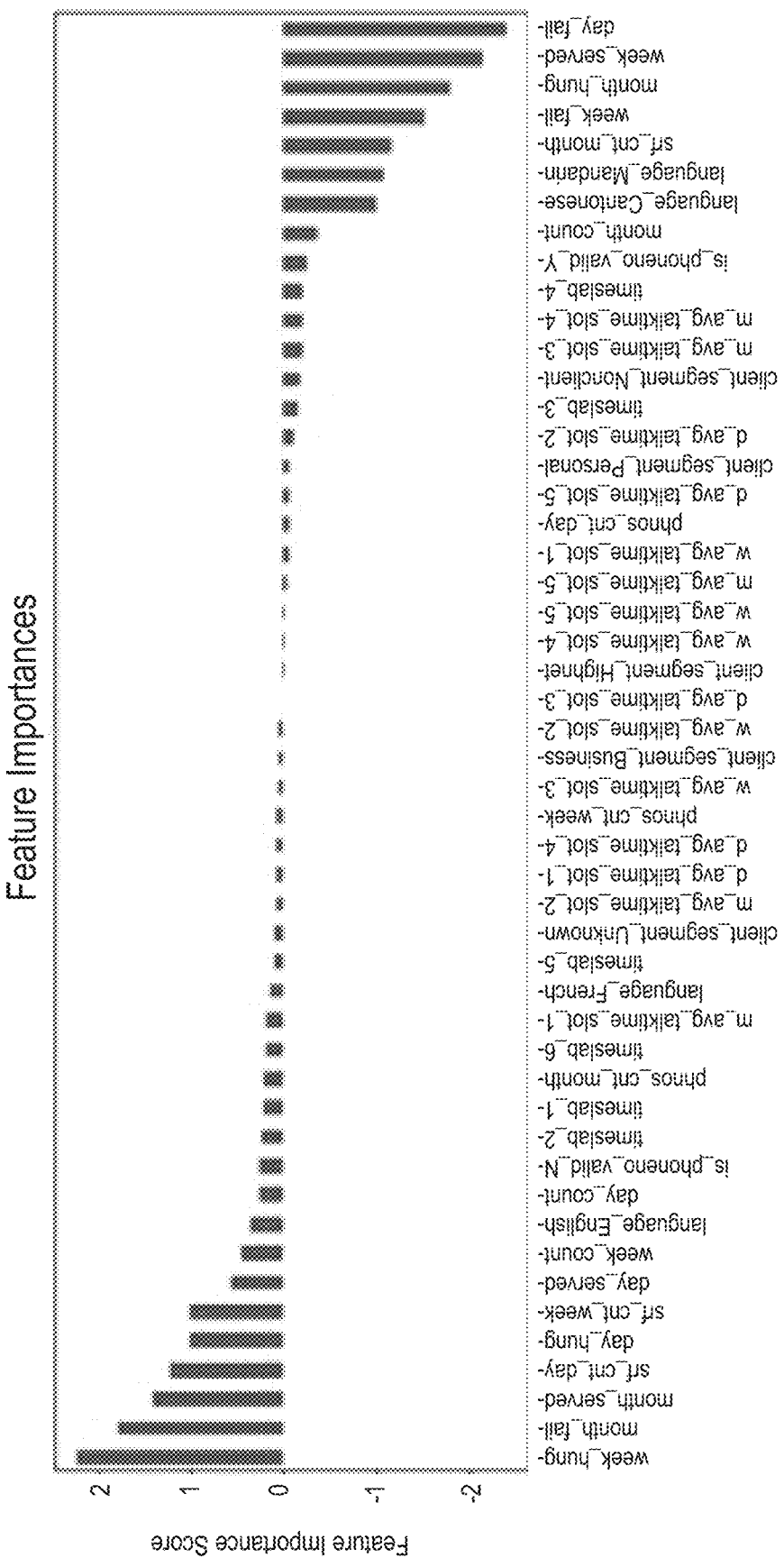
FIGS. 12 to 17 demonstrate various charts showing feature importance for machine learning models trained with different machine learning techniques.

The corresponding feature importance of the model with default parameters are plotted in FIG. 12.

The model was in some embodiments trained with different values of class weights, regularization parameters, iterations and different solvers. A cross validation with different values of K may be applied. The parameters which gave the best result are listed below:

Best Value of K is 2.
logReg=LogisticRegression (C=100, penalty='l2', fit_intercept=True, max_iter=100, tol=0.0001, n_jobs=1, class_weight='balanced', solver='liblinear', random_state=42)

Figure 13:
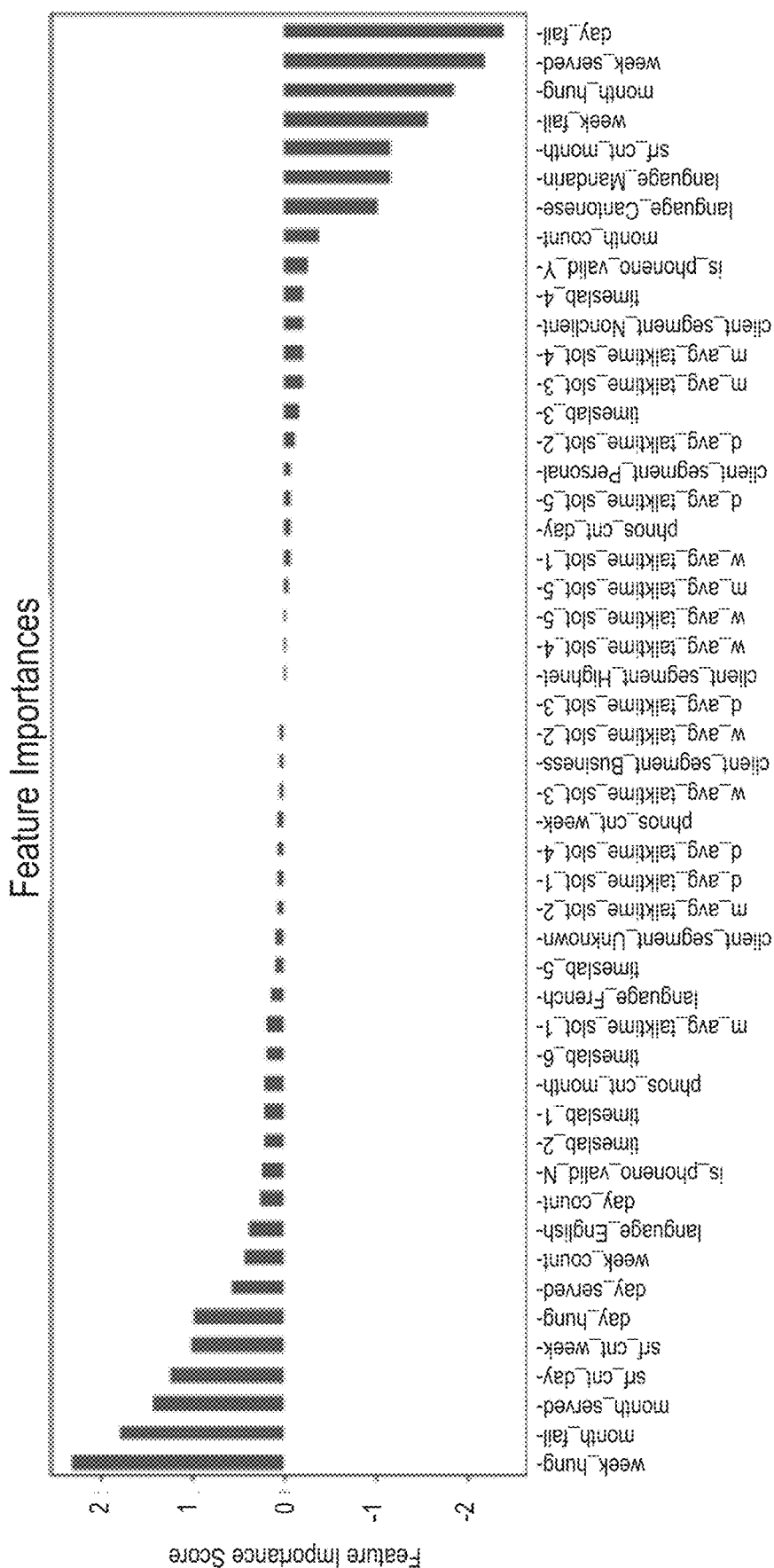

The feature importance of the model with the best parameters is shown in FIG. 13.

The machine learning model can also be trained with gradient boosting, with default parameters but by synthesizing the minority class using SMOTE, using the following parameters:

gbm=GradientBoostingClassifier (learning_rate=0.1, min_samples_split=2, n_estimators=100, min_samples_leaf=1, max_depth=3, max_features=None, subsample=1.0, random_state=42)

Figure 14:
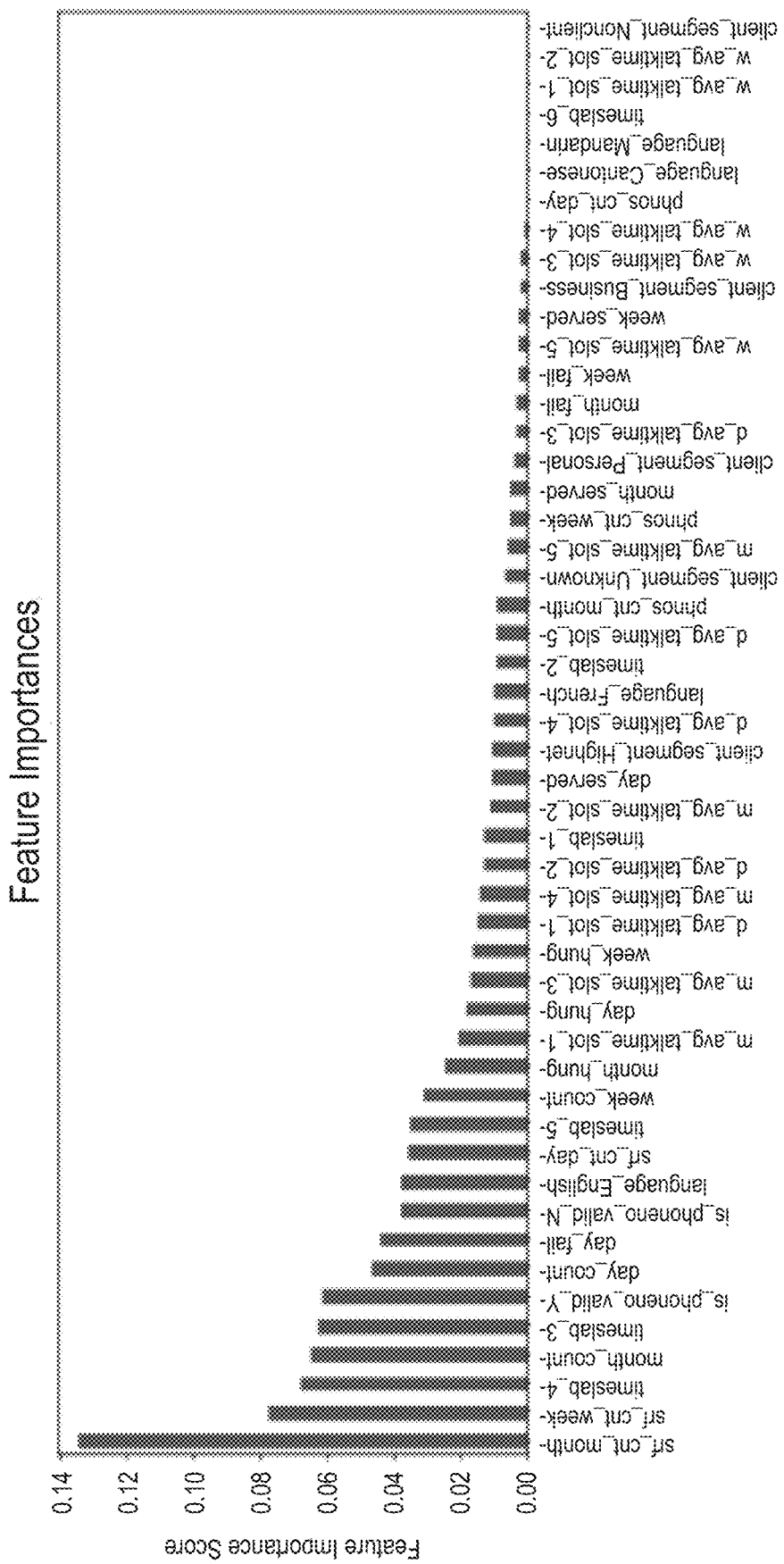

The feature importance of the model with default parameters is shown in FIG. 14.

With learning rate kept constant at 0.1 and by setting the other parameters to initial values, the model may be trained with different number of estimators and the best number of estimators may be found for the model. For example, with learning rate at 0.1 and its corresponding number of estimators, we started tuning the tree specific parameters in the order of: max_depth, min_samples_split, min_samples_leaf and max_features.

Subsample may be then tuned. After tuning all the parameters, the learning rate was iteratively lowered and accordingly increased the number of estimators.

The best parameters that we found are given below.
gbm=GradientBoostingClassifier(learning_rate=0.01, min_samples_split=700, n_estimators=800, min_samples_leaf=30, max_depth=8, max_features=13, subsample=0.8, random_state=42)

Figure 15:
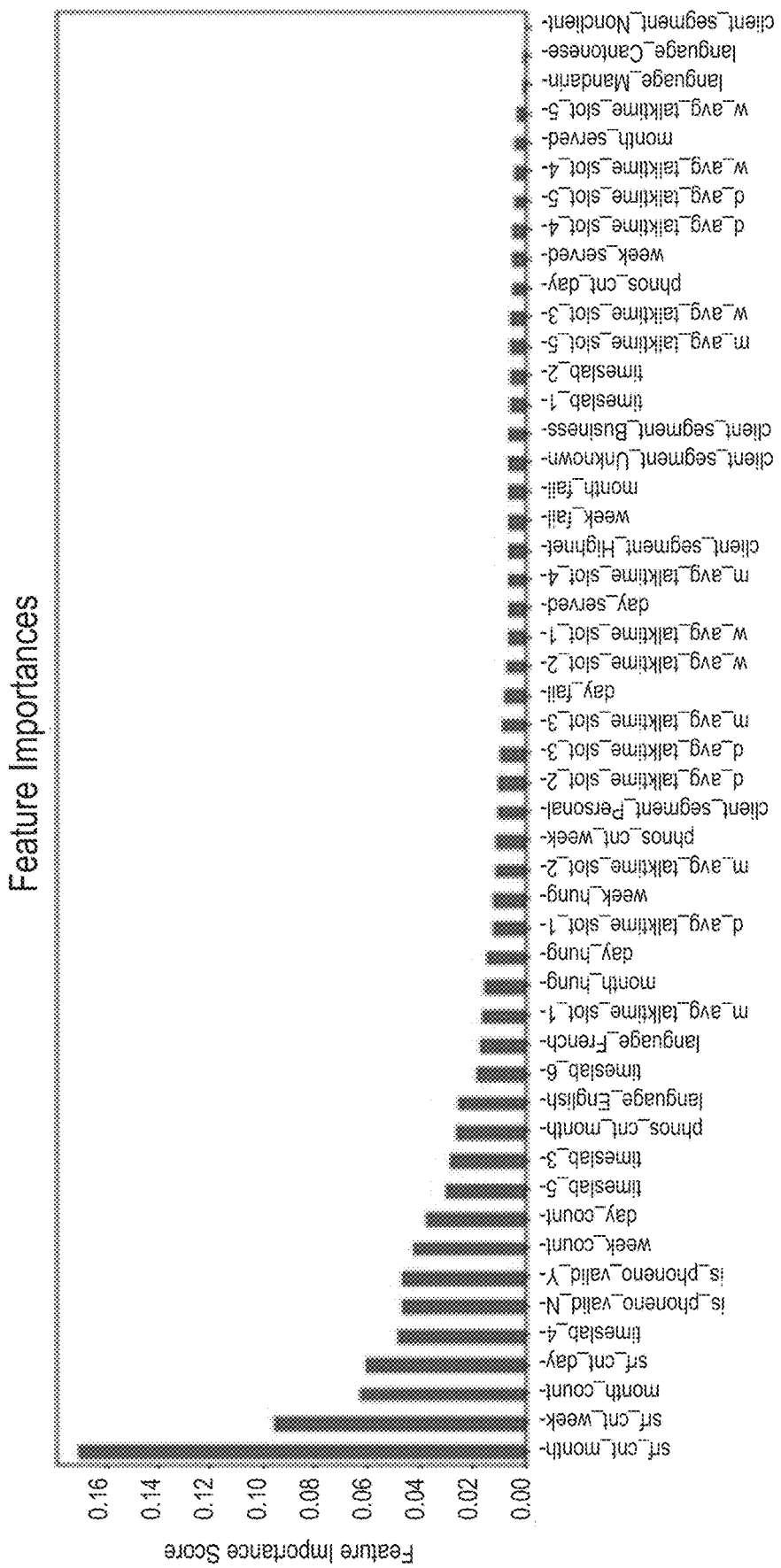

The feature importance with the best parameters is shown in FIG. 15.

The machine learning model may be trained with Extreme Gradient Boosting. For example, the model may be trained with default parameters first except scale_pos_weight, and use the following parameters:

xgbc=xgb.XGBClassifier(learning_rate=0.1, n_estimators=100, max_depth=3, min_child_weight=1, gamma=0, subsample=1.0, colsample_bytree=1.0, objective='binary:logistic', n_jobs=−1, reg_alpha=0, scale_pos_weight=float(np.sum(self.target==0))/np.sum (self.target==1)/1.7, random_state=42)

Figure 16:
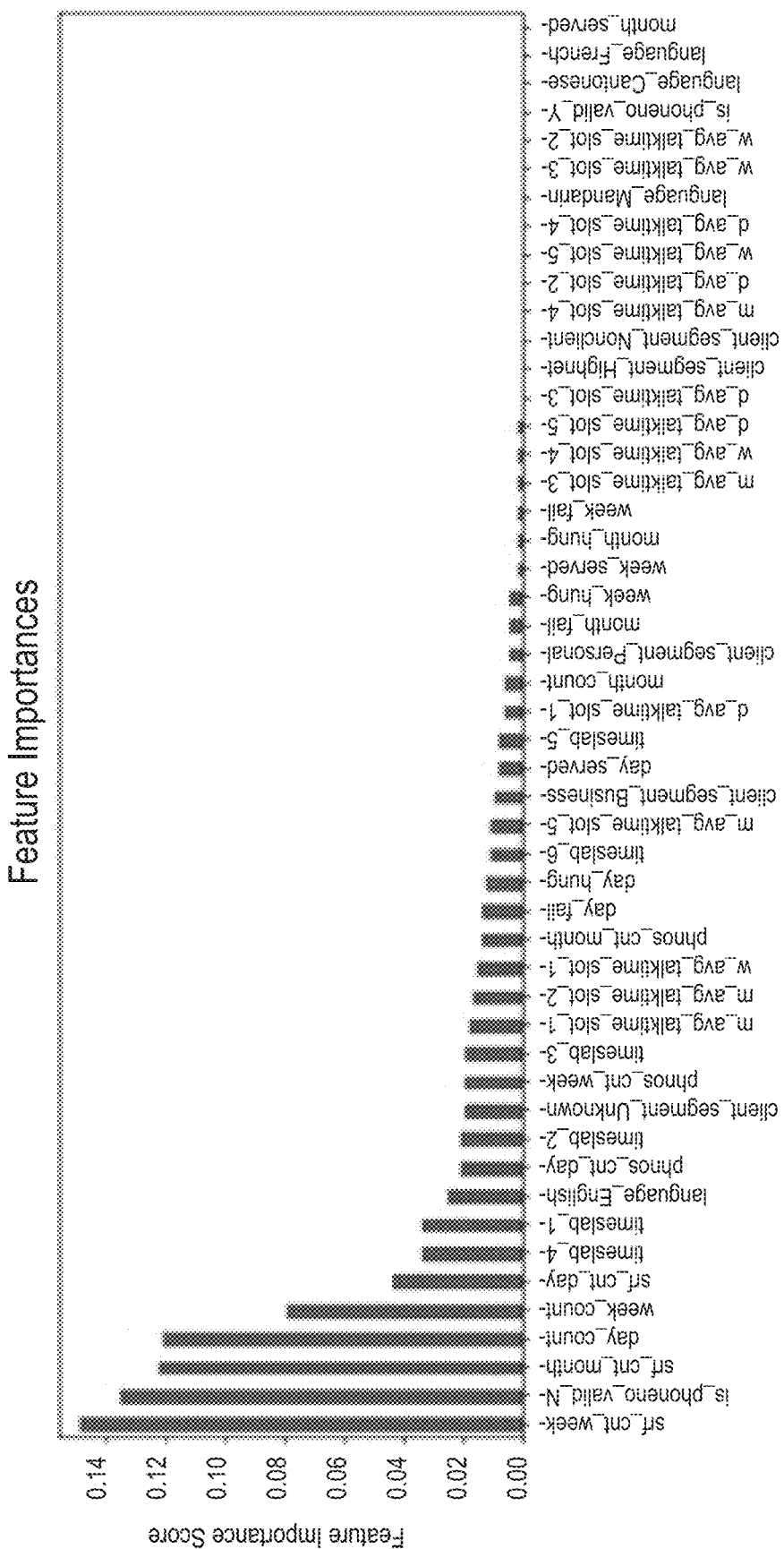

The feature importance of the model with default parameters is shown in FIG. 16.

Similar to gradient boosting, learning rate is constant at 0.1 and the number of estimators is tuned. The parameters are then tuned in the order: max_depth, min_child_weight, gamma, subsample, colsample_bytree and then regularization parameter.

After tuning all the parameters, the learning rate may be iteratively lowered and the number of estimators increased accordingly till the best result is obtained xgbc=xgb.XGBClassifier(learning_rate=0.1, n_estimators=80, max_depth=5, min_child_weight=1, gamma=0, subsample=0.5, colsample_bytree=0.3, objective='binary:logistic', n_jobs=−1, reg_alpha=0, scale_pos_weight=float(np.sum(self.target==0))/np.sum (self.target==1)/1.7, random_state=42)

Figure 17:
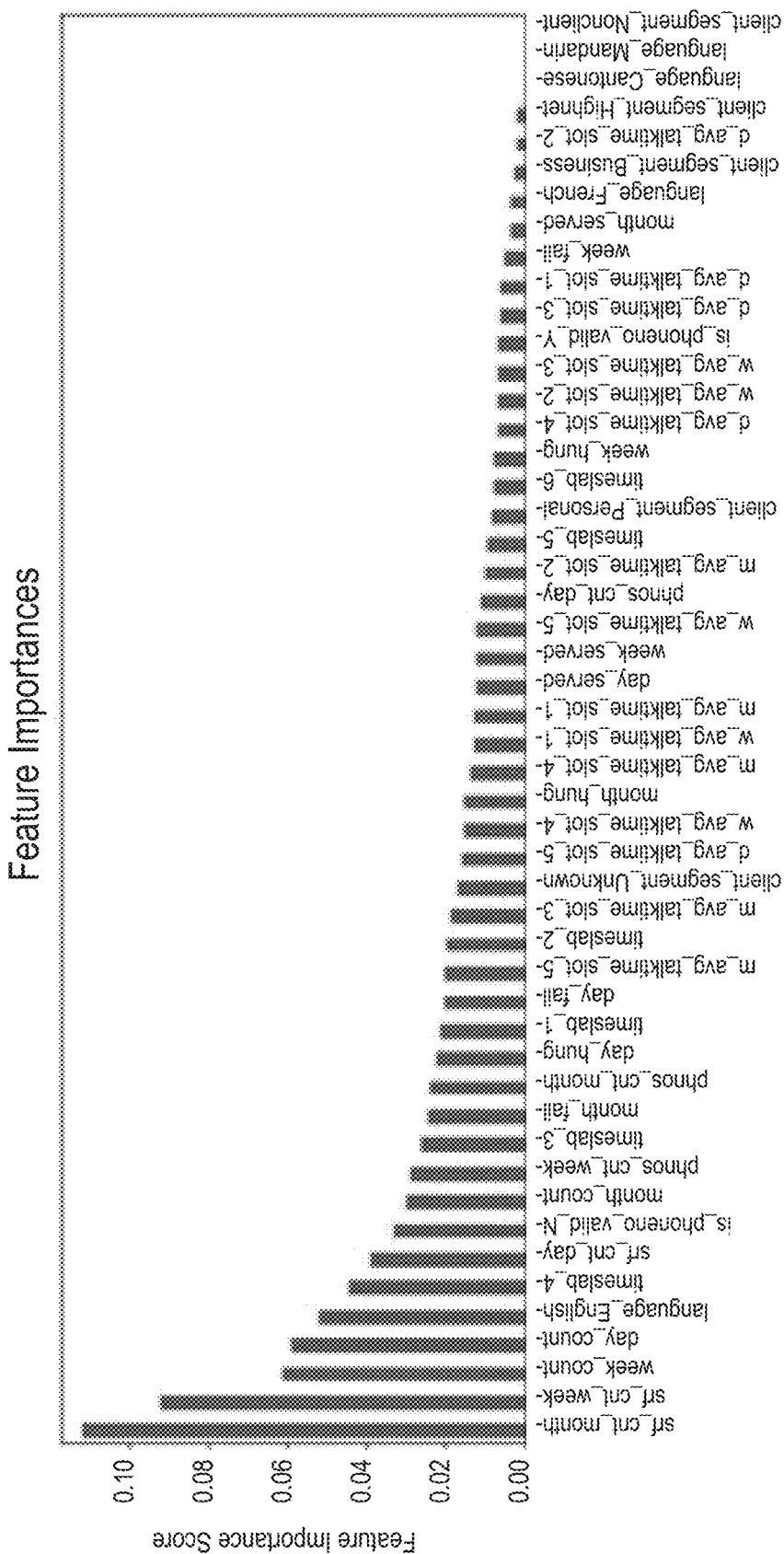

The feature importance of the model after fine-tuning the parameters is shown in FIG. 17.

In some embodiments, ensemble of models may be implemented. The best model was found to be extreme gradient boosting. This model was able to predict 62% of the suspicious calls accurately with 0.8% false positives.

An example suspiciousness meter is shown in FIG. 4, showing a meter 402 along with potential comments, the meter being scaled based on a determined suspiciousness score 405 (e.g. a score of 82/100 indicates a high probability that the call is fraudulent). In some embodiments, the range of movement of the meter and the incremental steps may be modified to indicate, for example, deviations from a mean, or to further highlight differences from an expected average. For example, different types of calls may have different characteristics and the meter may need to be suitably adjusted to provide meaningful information to the agent. The meter 402 may include a text portion 403 alerting users (e.g. agents) that the call is highly likely to be fraudulent. The meter 402 may also include a graphical representation 404 that is coloured in a bright colour (e.g. red) to indicate the high probability of a fraudulent nature of the call.

Figure 5:
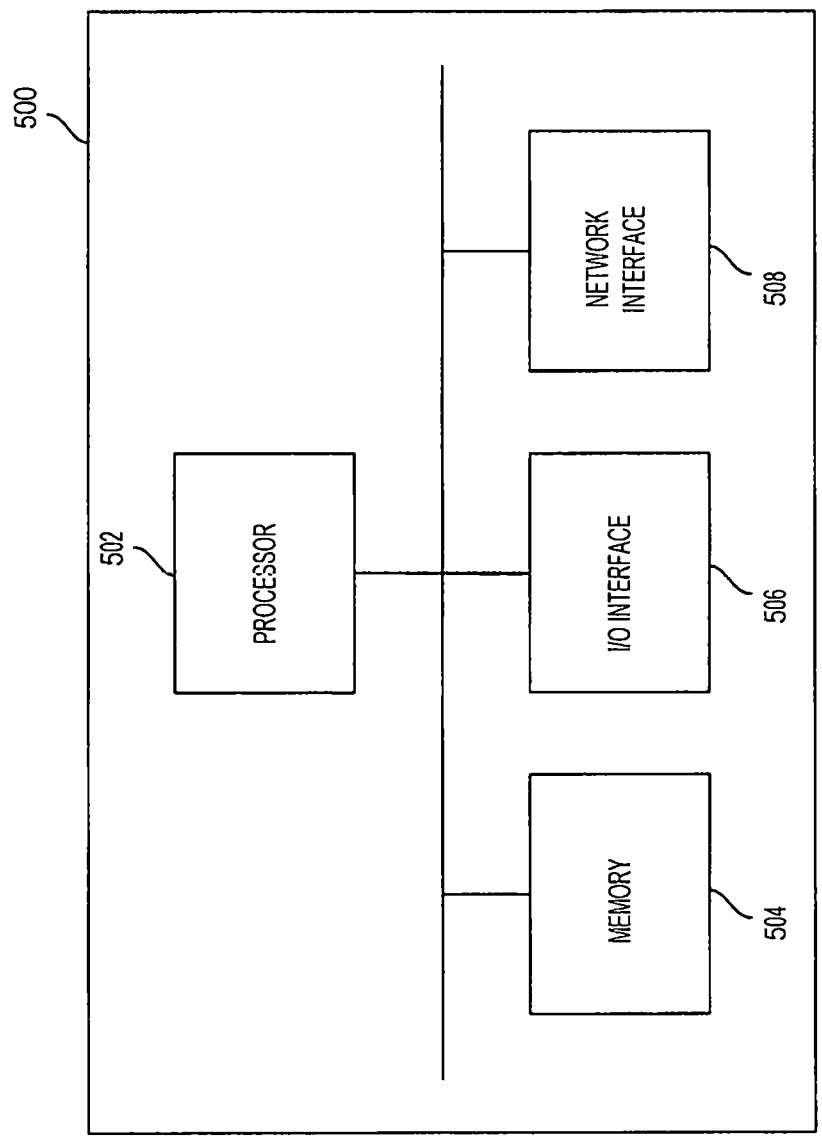
FIG. 5 is an example computing system, according to some embodiments.

FIG. 5 is a schematic diagram of computing device 500, exemplary of an embodiment. As depicted, computing device includes at least one processor 502, memory 504, at least one I/O interface 506, and at least one network interface 508.

Processor 502 may be an Intel or AMD x86 or x64, PowerPC, ARM processor, among others. Memory 504 may include a combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables computing device 500 to interconnect with one or more input devices, such as a keyboard, mouse, camera, touch screen and a microphone, or with one or more output devices such as a display screen and a speaker.

Each network interface 508 enables computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 500 is operable to register and authenticate users (using a login, unique identifier, and password for example) prior to providing access to applications, a local network, network resources, other networks and network security devices. Computing devices 500 may serve one user or multiple users.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

The invention claimed is:

1. A computer implemented method for routing a call received at a call centre based on one or more characteristics of call data, the method comprising:
    receiving or retrieving a first data set associated with a first set of call features relating to an on-going call, the first data set including: data representing a caller identifier associated with the on-going call, a time the on-going call was received at the call centre, and account identifying information associated with an electronic account;
    generating, using a machine learning model, a suspiciousness score of the on-going call based on a call history of the caller identifier with the call centre, an attempted access history for the electronic account, and an enumerated time period in which the time the on-going call was received at the call centre, the suspiciousness score indicating a probability of the on-going call being a fraudulent call;
    routing the on-going call based on the suspiciousness score;
    displaying the first suspiciousness score on a graphical user interface;
    receiving or retrieving a second data set associated with the first set or additional call features relating to the on-going call;
    updating the suspiciousness score of the on-going call based on the second data set; and
    displaying the updated suspiciousness score on the graphical user interface.

2. The method of claim 1, wherein the first set of call features relating to the on-going call includes one or more historical call features regarding the on-going call.

3. The method of claim 2, wherein the one or more historical call features include one or more of: a telephone number, a client account number, a number of call times associated with the telephone number in a time period, a number of client account numbers associated with the telephone number in a time period, a number of distinct telephone numbers associated with the client account number, a client segment associated with the client account number, a number of authentication failures associated with the telephone number or the client account number in a time period, a number of hung-ups associated with the telephone number or the client number in a time period, an average past call duration associated with the telephone number or the client number, a number of times the client account number is accessed in a time period, and a validity of the telephone number.

4. The method of claim 3, wherein the one or more historical call features are retrieved based on a client ID relating to the on-going call.

5. The method of claim 4, wherein the client ID comprises a telephone number or a client account number.

6. The method of claim 1, comprising training the machine learning model by:
    receiving one or more training data sets of call data having one or more labelled fraudulent calls interspersed within a plurality of non-fraudulent calls; and using a machine learning device, extracting one or more feature templates from the one or more training data sets representing features indicative of a fraudulent call.

7. The method of claim 1, wherein the second data set is received or retrieved in real time or near real time and collected on a iterative basis.

8. The method of claim 1, wherein the first set of call features and the second set of call features contain one or more identical call features relating to the on-going call, and the one or more identical call features are iteratively updated during the on-going call.

9. The method of claim 1, comprising upon the suspiciousness score breaching a predefined limit, flagging or terminating the on-going call.

10. The method of claim 1, comprising rendering the suspiciousness score as an interactive interface element on the graphical user interface.

11. The method of claim 1, wherein the first or second data set includes both voice data and interactive voice response system (IVR) data.

12. The method of claim 1, wherein routing the on-going call comprises: parking the on-going call in a queue, forwarding the on-going call to a human agent, forwarding the on-going call to a machine; removing the on-going call from a queue; or terminating the on-going call.

13. The method of claim 12, wherein routing the on-going call based on the suspiciousness score comprises routing the on-going call when the suspiciousness score is above or beneath a pre-determined threshold.

14. The method of claim 13, comprising routing the on-going call to a human agent when the suspiciousness score is beneath the pre-determined threshold.

15. The method of claim 1, comprising routing the on-going call based on the updated suspiciousness score.

16. The method of claim 1, wherein the attempted access history for the electronic account includes data representing attempted access to the electronic account via an internet web server.

17. A system for routing a call based on one or more characteristics of call data, the system comprising a memory device having machine-readable code stored thereon, and a processor configured to, upon executing the machine-readable code:
receive or retrieve a first data set associated with a first set of call features relating to an on-going call, the first data set including: data representing a caller identifier associated with the on-going call, a time the on-going call was received at the call centre, and account identifying information associated with an electronic account;
generate, using a machine learning model, a suspiciousness score of the on-going call based on a call history of the caller identifier with the call centre, an attempted access history for the electronic account, and an enumerated time period in which the time the on-going call was received, the suspiciousness score indicating a probability of the on-going call being a fraudulent call;
route the on-going call based on the suspiciousness score;
render a graphical user interface including the first suspiciousness score;
receive or retrieve a second data set associated with the first set or additional call features relating to the on-going call;
update the suspiciousness score of the on-going call based on the second data set; and
display the updated suspiciousness score on the graphical user interface.

18. The system of claim 17, wherein the first set of call features relating to the on-going call includes one or more historical call features regarding the on-going call.

19. The system of claim 18, wherein the one or more historical call features include one or more of: a telephone number, a client account number, a number of call times associated with the telephone number in a time period, a number of client account numbers associated with the telephone number in a time period, a number of distinct telephone numbers associated with the client account number, a client segment associated with the client account number, a number of authentication failures associated with the telephone number or the client account number in a time period, a number of hung-ups associated with the telephone number or the client number in a time period, an average past call duration associated with the telephone number or the client number, a number of times the client account number is accessed in a time period, and a validity of the telephone number.

20. The system of claim 19, wherein the one or more historical call features are retrieved based on a client ID relating to the on-going call.

21. The system of claim 17, wherein the processor is configured to train the machine learning model by:
receiving one or more training data sets of call data having one or more labelled fraudulent calls interspersed within a plurality of non-fraudulent calls; and
using a machine learning device, extracting one or more feature templates from the one or more training data sets representing features indicative of a fraudulent call.

22. The system of claim 17, wherein the second data set is received or retrieved in real time or near real time and collected on a iterative basis.

23. The system of claim 17, wherein the first set of call features and the second set of call features contain one or more identical call features relating to the on-going call, and the one or more identical call features are iteratively updated during the on-going call.

24. The system of claim 17, comprising upon the suspiciousness score breaching a predefined limit, flagging or terminating the on-going call.

25. The system of claim 17, comprising rendering the suspiciousness score as an interactive interface element on the graphical user interface.

26. The system of claim 17, wherein the first or second data set includes both voice data and interactive voice response system data.

27. The system of claim 17, wherein routing the on-going call comprises: parking the on-going call in a queue, forwarding the on-going call to a human agent, forwarding the on-going call to a machine; removing the on-going call from a queue; or terminating the on-going call.

28. The system of claim 27, wherein routing the on-going call based on the suspiciousness score comprises routing the on-going call when the suspiciousness score is above or beneath a pre-determined threshold.

29. The system of claim 28, wherein the processor is configured to route the on-going call to a human agent when the suspiciousness score is beneath the pre-determined threshold.

30. The system of claim 17, wherein the processor is configured to route the on-going call based on the updated suspiciousness score.

* * * * *